United States Patent
Niimi et al.

(10) Patent No.: US 12,153,393 B2
(45) Date of Patent: Nov. 26, 2024

(54) CONTROL SYSTEM, SUPPORT DEVICE, AND COMPUTER-READABLE STORAGE MEDIUM

(71) Applicant: OMRON Corporation, Kyoto (JP)

(72) Inventors: Taiga Niimi, Kyoto (JP); Mitsuhiro Yoneda, Kyoto (JP); Ryota Akai, Kyoto (JP); Nobuyuki Sakatani, Kyoto (JP); Shigenori Sawada, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 277 days.

(21) Appl. No.: 17/622,616

(22) PCT Filed: Mar. 10, 2020

(86) PCT No.: PCT/JP2020/010349
§ 371 (c)(1),
(2) Date: Dec. 23, 2021

(87) PCT Pub. No.: WO2021/002060
PCT Pub. Date: Jan. 7, 2021

(65) Prior Publication Data
US 2022/0357715 A1    Nov. 10, 2022

(30) Foreign Application Priority Data
Jul. 3, 2019    (JP) .................... 2019-124436

(51) Int. Cl.
G05B 19/05    (2006.01)
(52) U.S. Cl.
CPC ......... *G05B 19/056* (2013.01); *G05B 19/052* (2013.01)
(58) Field of Classification Search
None
See application file for complete search history.

(56) References Cited

U.S. PATENT DOCUMENTS

| | | | | |
|---|---|---|---|---|
| 4,858,101 A | * | 8/1989 | Stewart | G05B 19/052 710/1 |
| 5,546,543 A | * | 8/1996 | Yang | G06F 13/30 710/21 |

(Continued)

FOREIGN PATENT DOCUMENTS

| | | |
|---|---|---|
| CN | 1147785 C | 4/2004 |
| CN | 106020009 A | 10/2016 |

(Continued)

OTHER PUBLICATIONS

International Search Report of PCT/JP2020/010349 dated Jun. 9, 2020 [PCT/ISA/210].

(Continued)

*Primary Examiner* — David Earl Ogg
(74) *Attorney, Agent, or Firm* — Sughrue Mion, PLLC

(57) ABSTRACT

A control system includes plural control devices connected to a network, each of the control devices including a program storage, an operation module, and an arbitration module. The program storage stores a control program including a command to calculate and update a control instruction that is a value related to control of a control target. The operation module operates the control program of the program storage of the control device. The arbitration module disposes plural control programs including a command to calculate and update an identical control instruction in another one of the plural control devices, and arbitrates an operation time between the plural control programs such that updatings of the identical control instruction do not conflict with each other in the plural control programs.

15 Claims, 33 Drawing Sheets

(56) References Cited

U.S. PATENT DOCUMENTS

| | | |
|---|---|---|
| 6,105,127 A | 8/2000 | Kimura et al. |
| 2004/0098526 A1 | 5/2004 | Matsumoto et al. |
| 2016/0291581 A1 | 10/2016 | Eguchi et al. |
| 2019/0101904 A1 | 4/2019 | Shimamura et al. |
| 2019/0361696 A1* | 11/2019 | Nakano .................. B60R 16/02 |
| 2021/0173370 A1* | 6/2021 | Pan ......................... B25J 9/161 |

FOREIGN PATENT DOCUMENTS

| | | | | |
|---|---|---|---|---|
| CN | 108401168 A | | 8/2018 | |
| DE | 10 2008 018 962 A1 | | 10/2009 | |
| EP | 2 222 003 A2 | | 8/2010 | |
| EP | 2 806 520 A1 | | 11/2014 | |
| EP | 3 373 087 A1 | | 9/2018 | |
| JP | 10-164167 A | | 6/1998 | |
| JP | 2004178578 A | * | 6/2004 | ............... G06F 9/52 |
| JP | 2009-17269 A | | 1/2009 | |
| JP | 2010-224939 A | | 10/2010 | |
| JP | 2018180706 A | * | 11/2018 | |
| JP | 6481248 B1 | | 3/2019 | |
| JP | 2019-067046 A | | 4/2019 | |
| JP | 2019-106225 A | | 6/2019 | |

OTHER PUBLICATIONS

Written Opinion of PCT/JP2020/010349 dated Jun. 9, 2020 [PCT/ISA/210].

Extended European Search Report dated Feb. 20, 2023 in Application No. 20834364.0.

Communication dated Feb. 8, 2024, issued in Chinese Application No. 202080046811.9.

Communication dated Aug. 5, 2024 issued in Chinese Application No. 202080046811.9.

* cited by examiner

| | | | |
|---|---|---|---|
| 151 — PROGRAM NAME | UPG (1) | UPG (2) | UPG (3) |
| 152 — EXECUTION TIME | t1 | t2 | t3 |
| 153 — VARIABLE | a1 b1 c1 | a2 b2 c2 | a3 b3 c3 |

FIG.29

| CASE | INFORMATION PREVIOUSLY POSSESSED BY DEVICE | NOTIFICATION CONTENT | OPERATION OF DEVICE |
|---|---|---|---|
| 1 | NOTHING | 31 { • EXECUTION START TIME — 291<br>• STREAM ID USED FOR COMMUNICATION OF VARIABLE DATA — 292 | (1) ONLY DATA OF STREAM ID OF NOTIFICATION CONTENT IS RECEIVED AFTER EXECUTION TIME |
| 2 | • STREAM ID USED FOR COMMUNICATION OF VARIABLE DATA — 872 | 31 { • EXECUTION START TIME — 291<br>• STREAM ID USED FOR COMMUNICATION OF VARIABLE DATA — 292 | (1) REGISTERED STREAM ID AND STREAM ID OF NOTIFICATION CONTENT ARE COLLATED WITH EACH OTHER, AND ABNORMAL NOTIFICATION IS TRANSMITTED TO PLC WHEN REGISTERED STREAM ID AND STREAM ID OF NOTIFICATION CONTENT ARE NOT MATCHED WITH EACH OTHER<br>(2) ONLY DATA OF STREAM ID OF NOTIFICATION CONTENT IS RECEIVED AFTER EXECUTION TIME |
| 3 | • STREAM ID USED FOR COMMUNICATION OF VARIABLE DATA — 872<br>• ORDER OF STREAM ID — 873 | 31 { • EXECUTION START TIME — 291<br>• STREAM ID USED FOR COMMUNICATION OF VARIABLE DATA — 292 | (1) REGISTERED STREAM ID AND STREAM ID OF NOTIFICATION CONTENT ARE COLLATED WITH EACH OTHER, AND ABNORMAL NOTIFICATION IS TRANSMITTED TO PLC WHEN REGISTERED STREAM ID AND STREAM ID OF NOTIFICATION CONTENT ARE NOT MATCHED WITH EACH OTHER<br>(2) ORDER OF REGISTERED STREAM ID AND ORDER OF STREAM ID OF NOTIFICATION CONTENT ARE COLLATED WITH EACH OTHER, AND ABNORMAL NOTIFICATION IS TRANSMITTED TO PLC WHEN ORDER IS DIFFERENT<br>(3) ONLY DATA OF STREAM ID OF NOTIFICATION CONTENT IS RECEIVED AFTER EXECUTION TIME |

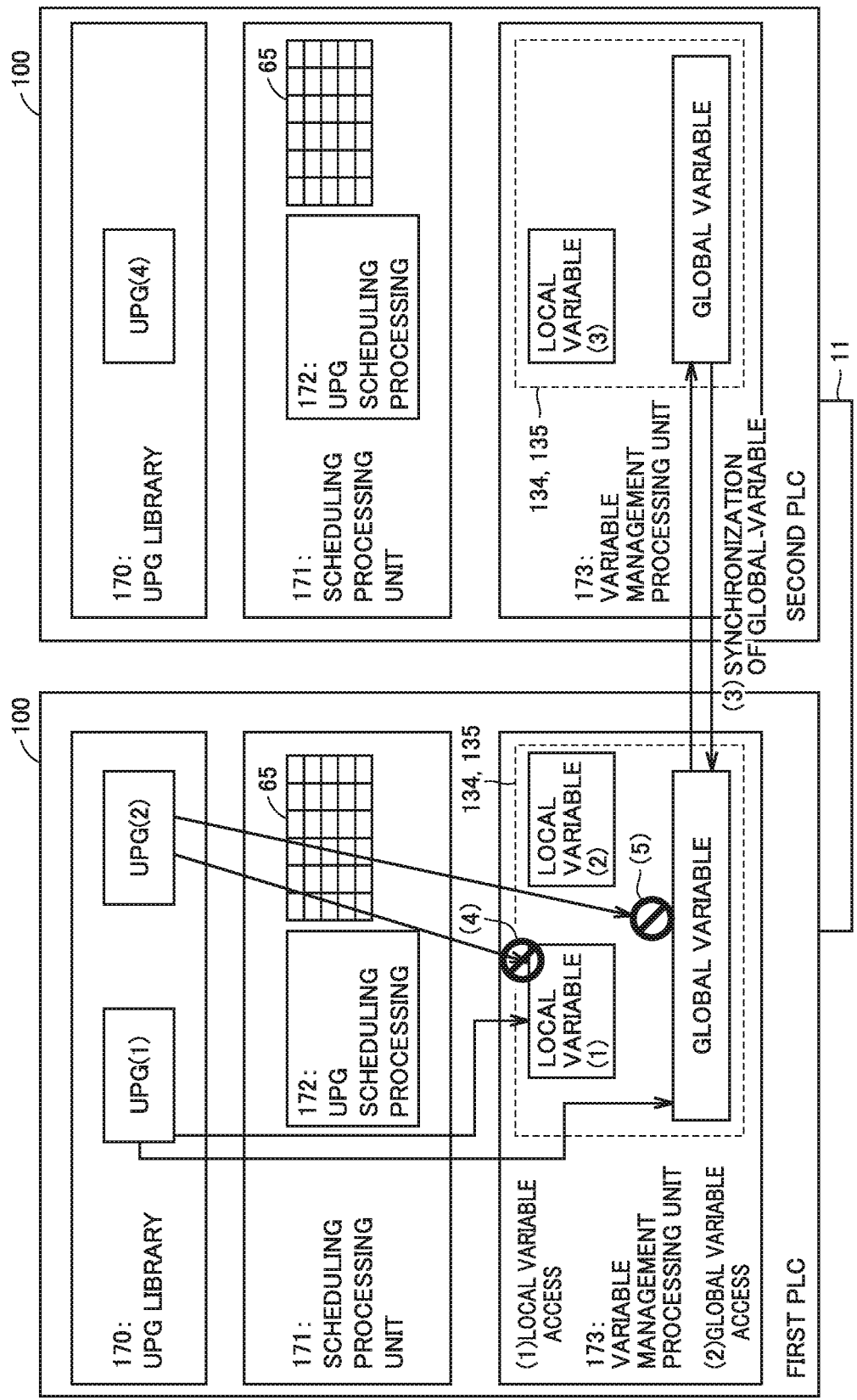

CONTROL SYSTEM, SUPPORT DEVICE, AND COMPUTER-READABLE STORAGE MEDIUM

CROSS REFERENCE TO RELATED APPLICATIONS

This application is a National Stage of International Application No. PCT/JP2020/010349 filed on Mar. 10, 2020, claiming priority based on Japanese Patent Application No. 2019-124436 filed on Jul. 3, 2019, the entire contents of each of which being herein incorporated by reference in their entireties.

TECHNICAL FIELD

The present disclosure relates to a control system, a support device, and a setting program for controlling a target.

BACKGROUND ART

A factory automation (FA) system using a control device such as a programmable logic controller (PLC) is widely used in various production sites. The PLC gives a control instruction to a control target by operating (executing) a control program of the control target such as a field device including a robot. In recent years, a scale of an FA system tends to increase, and accordingly, the FA system includes a plurality of PLCs connected to a network.

For example, Japanese Patent Laying-Open No. 10-164167 (PTL 1) discloses a programmable controller that conducts cyclic communication with another programmable controller through a communication device as a system including a plurality of PLCs.

CITATION LIST

Patent Literature

PTL 1: Japanese Patent Laying-Open No. 10-164167

SUMMARY OF INVENTION

Technical Problem

Conventionally, even in the system including the plurality of PLCs, the PLC that operates each control program is fixed in accordance with each control program. On the other hand, a user needs to freely dispose the control program among the plurality of PLCs in the FA system.

An object of the present disclosure is to provide a control system, a support device, and a setting program that can respond to the above needs.

Solution to Problem

According to one aspect of the present disclosure, a control system includes: a plurality of control devices connected to a network; program storage included in each control device storing a control program including a command to calculate and update a control instruction that is a value related to control of a control target; operation module included in each control device to operate the control program of the program storage of the control device; and arbitration module configured to dispose a plurality of control programs including a command to calculate and update an identical control instruction in at least one of the plurality of control devices, and arbitrate an operation time between the plurality of control programs such that updatings of the identical control instruction do not conflict with each other in the plurality of control programs.

According to this disclosure, even when the plurality of control programs calculating and updating the control instruction for the identical control target is disposed in at least one of the plurality of control devices, the operation time is automatically arbitrated among the plurality of control programs such that the updatings of the identical control instruction does not conflict with each other in the plurality of control programs. Accordingly, the user can freely dispose the control program among the plurality of PLCs without being conscious of the conflict.

In the above disclosure, the arbitration module statically determines the operation times of the plurality of control programs such that the updatings of the identical control instruction does not conflict with each other in the plurality of control programs.

According to this disclosure, the operation times of the plurality of control programs can be statically determined so as to eliminate the conflict.

In the above disclosure, the arbitration module dispersedly disposes the plurality of control programs in the plurality of control devices, and arbitrates the operation time such that each of the plurality of control programs is operated in order according to progress of a process.

According to this disclosure, when the operation times of the plurality of control programs are determined so as to eliminate the conflict, the operation time can be determined according to the progress of the process.

In the above disclosure, the control instruction includes the control instruction provided to the control target, and the arbitration module further generates identification information for identifying the control instruction addressed to an own control target.

According to this disclosure, when the arbitration of the operation times is performed so as not to cause the conflict, the identification information that enables identification of the control instruction addressed to the control target can be generated for the control target.

In the above disclosure, the identification information for identifying the control instruction addressed to the own control target includes an identifier of a control program in which the control instruction to the control target is updated.

According to this disclosure, the identifier of the control program can be used to identify the control instruction addressed to the own control target.

In the above disclosure, the identification information for identifying the control instruction addressed to the own control target includes an order in which the plurality of control instructions are provided to the control target when the plurality of control instructions are provided to the control target.

According to this disclosure, in order that the control target identifies the control instruction addressed to the own control target, the order in which the control instruction should be given to the own control target can be used.

In the above disclosure, the order in which the plurality of control instructions are provided to the control target is based on an operation time arbitrated between the plurality of control programs updating the plurality of control instructions.

According to this disclosure, the order in which the control instruction is provided to the control target can be determined based on the operation time arbitrated between the control programs.

In the above disclosure, the control device notifies the control target of switching to one control program when the operation module operates the plurality of control programs while switching the plurality of control programs according to the arbitrated operation time, and a notification includes identification information for identifying the control instruction updated by the one control program after the switching.

According to this disclosure, the control device outputs the switching notification at the time of switching the control program to be operated, and can provide the identification information for identifying the control instruction updated by the control program after the switching to the control target using the notification.

In the above disclosure, the identification information includes the type of the control instruction. According to this disclosure, the identification information that can be provided to the control target can include the type corresponding to the control instruction provided to the control target, for example, the type of the variable.

In the above disclosure, the value related to the control includes the value of the variable updated by the control program during the operation. According to this disclosure, the value related to the control includes the value of the variable updated at the time of the operation of the control program, for example, a state value of the control target shared between the control programs, a control instruction, a command value, and the like.

According to another aspect of the present disclosure, a support device connectable to a control system including a plurality of control devices connected to a network, each of the control devices include: program storage storing a control program including a command to calculate and update a control instruction that is a value related to control of a control target; and operation module operating the control program of the program storage of the control device, the support device includes: disposition module configured to dispose a plurality of control programs including a command to calculate and update an identical control instruction in at least one of the plurality of control devices; and arbitration module configured to arbitrate an operation time between the plurality of control programs such that updatings of the identical control instruction do not conflict with each other in the plurality of control programs.

According to this disclosure, even when the plurality of control programs calculating and updating the control instruction for the identical control target is disposed in at least one of the plurality of control devices, the operation time is automatically arbitrated from the control program such that the updatings of the control instruction does not conflict with each other in the plurality of control programs. Accordingly, the user can freely dispose the control program among the plurality of control device without being conscious of the conflict.

According to still another aspect of the present disclosure, computer-readable storage medium storing a setting program for setting a behavior of a control system including a plurality of control devices connected to a network is provided. Each of the control devices includes: program storage storing a control program including a command to calculate and update a control instruction that is a value related to control of a control target; and operation module operating the control program of the program storage of the control device, the setting program causes a computer to execute: disposing a plurality of control programs including a command to calculate and update an identical control instruction in at least one of the plurality of control devices; and arbitrating an operation time between the plurality of control programs such that updatings of the identical control instruction do not conflict with each other in the plurality of control programs.

According to this disclosure, even when the plurality of control programs calculating and updating the control instruction for the identical control target is disposed in at least one of the plurality of control devices, the operation time is automatically arbitrated from the control program such that the control instruction does not conflict with each other in the plurality of control programs. Accordingly, the user can freely dispose the control program among the plurality of PLCs without being conscious of the conflict.

Advantageous Effects of Invention

According to the present disclosure, a freedom degree of the disposition of the control program between the control devices of the control system can be improved.

BRIEF DESCRIPTION OF DRAWINGS

FIG. 7 is a view schematically illustrating a configuration example of the communication frame 20 of the embodiment.

FIG. 29 is a view illustrating a relationship between a notification 31 of manager switching and a device operation of the embodiment.

FIG. 37 is a view schematically illustrating a concept of variable management of the embodiment.

DESCRIPTION OF EMBODIMENTS

Figure 1:
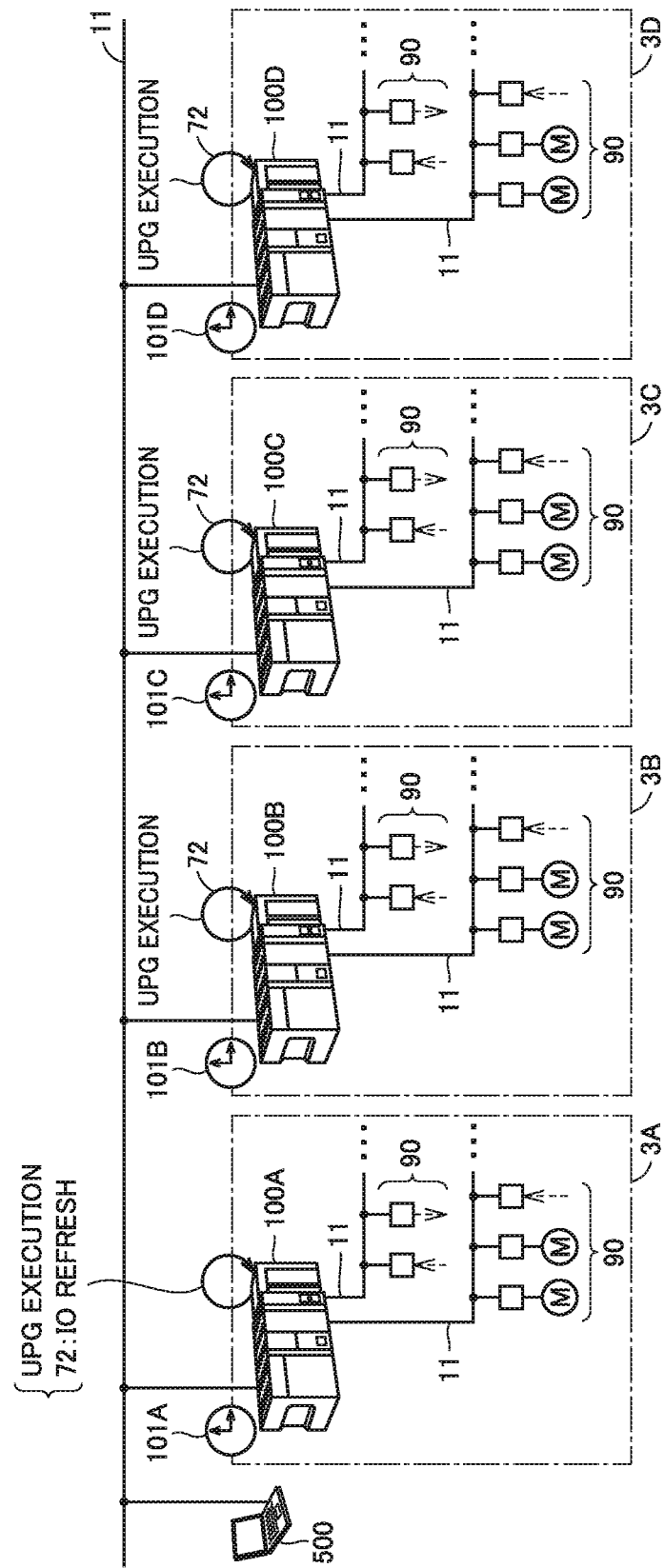
FIG. 1 is a view schematically illustrating an overall configuration of a system 1 according to an embodiment of the present invention.

Hereinafter, an embodiment of the present invention will be described with reference to the drawings. In the following description, the same components and constituents are denoted by the same reference numerals. Those names and functions are the same. Thus, the detailed description thereof will not be repeated.

A. Application Example

Figure 2:
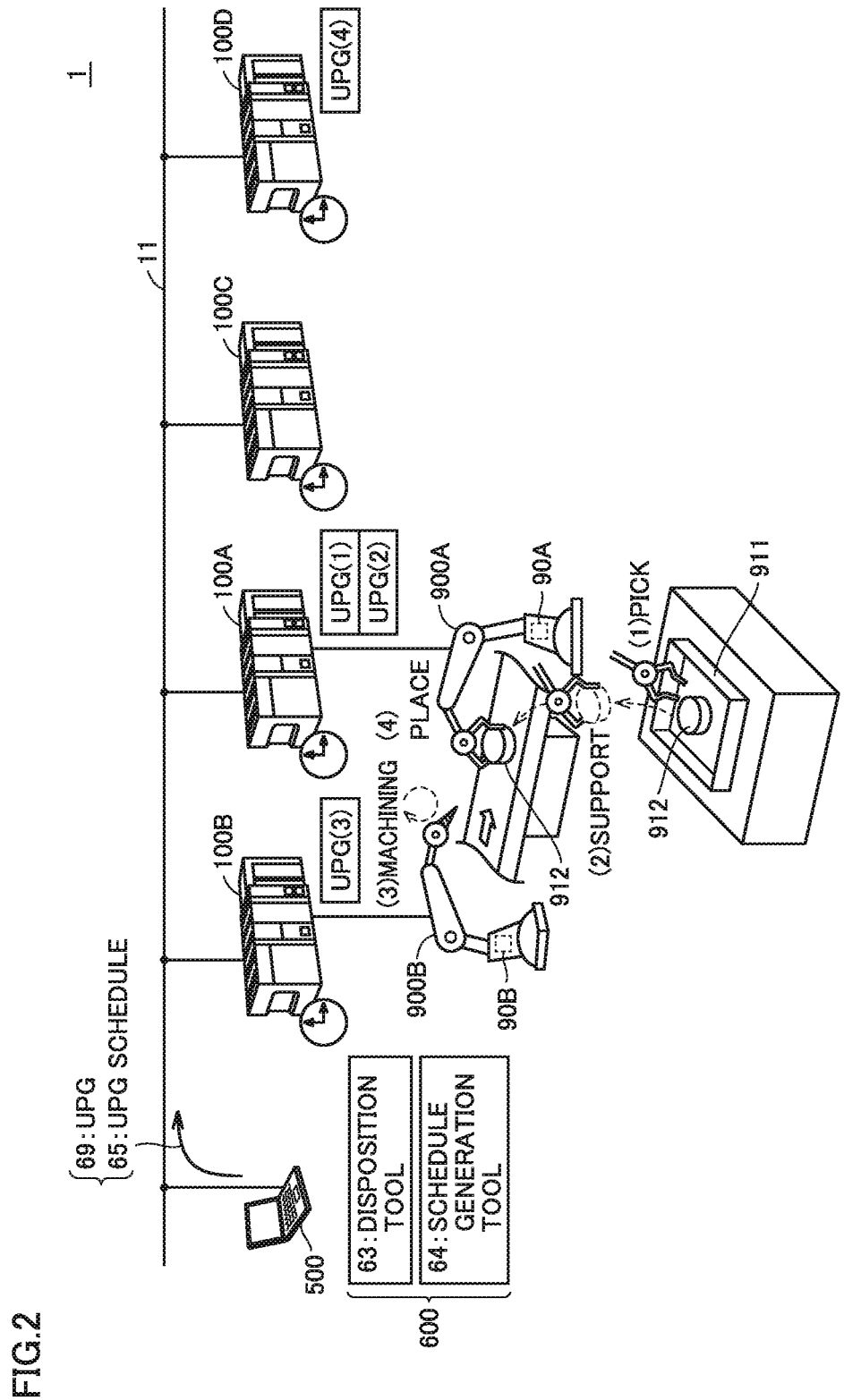
FIG. 2 is a view schematically illustrating the overall configuration of the system 1 of the embodiment.

Referring to FIGS. 1 and 2, an example of a scene to which the present invention is applied will be described. FIGS. 1 and 2 are views schematically illustrating an overall configuration of a system 1 of the embodiment. Referring to FIG. 1, system 1 applied to FA includes equipment groups 3A, 3B, 3C, and 3D. Each of equipment groups 3A, 3B, 3C, and 3D includes PLCs 100A, 100B, 100C, and 100D connected to a network 11, and one or a plurality of field devices 90 connected to each PLCs. Field device 90 of equipment group 3A in FIG. 1 includes a robot controller 90A of a robot 900A in FIG. 2, and field device 90 of equipment group 3B includes a robot controller 90B of a robot 900B in FIG. 2. Field device 90 is an example of the "control target".

PLCs 100A, 100B, 100C, and 100D are examples of the "control device", and have similar functions. For this reason, the PLCs are collectively referred to as PLC 100 unless the PLCs are distinguished from one another. System 1 can also connect a support device 500 to network 11. A management server of system 1 that communicates with PLC 100 through network 11 may be connected to system 1.

Each PLC 100 connects field devices 90 on one or a plurality of field sides through network 11. Each of field devices 90 includes an actuator that gives some physical action to a manufacturing device, a production line, or the like (hereinafter, also collectively referred to as a "field"), an input and output device that exchanges information with the field, and robot controllers 90A, 90B that control robots 900A, 900B. A type of the field device is not limited thereto. At this point, two robots 900A, 900B are illustrated, but the number of robots is not limited to two.

In system 1, a timer 101A of PLC 100A, a timer 101B of PLC 100B, a timer 101C of PLC 100C, and to timer 101D of PLC 100D are time-synchronized with each other. PLC 100 and one or the plurality of field devices 90 connected to PLC 100 are time-synchronized with each other. Thus, in system 1, all the devices are time-synchronized with each other.

In system 1, a unified communication protocol is applied to network 11 between PLCs 100 and network 11 on the field side. In the embodiment, for example, time-sensitive networking (TSN) is adopted as the unified communication protocol. Accordingly, when the data is exchanged between all the devices (PLC 100 and field device 90) of system 1, the conversion of the communication protocol can be omitted and the communication can be conducted at a high speed as compared with the case that the communication protocol between PLCs 100 is different from the communication protocol between PLC 100 and field device 90. The communication time of the TSN is sufficiently shorter than the control period (cycle) of system 1. Accordingly, the data can be shared among all the devices for each control period.

PLC 100 performs IO refresh 72 exchanging the data with the field in each control period, and executes a later-described user program (UPG) 69 based on a field value collected from the field. UPG 69 is an example of the "control program" having a command to calculate and update a control instruction that is a value related to the control of the control target. The field value collected from the field may include a state value indicating a state of the control target. PLC 100 executes control arithmetic processing based on the field value by executing the command of UPG 69, and transmits a calculated value by the control arithmetic processing to field device 90. The calculated value corresponds to an example of the "control instruction" for controlling field device 90. The "control instruction" only needs to be a value related to the control, and includes, but is not limited to, a value (for example, a value (state value) indicating a behavior of the control target) shared between UPGs 69 or a value given to the control target (for example, an instruction value and a controlled variable).

As described above, PLC 100 executes IO refresh 72, which collects the field value from field device 90 in each control period and outputs the control instruction calculated by the execution of UPG 69 to field device 90. In system 1, the control arithmetic processing of UPG 69 in PLC 100 and IO refresh 72 can be executed within the control period, for example, which is the time based on the above-described time synchronization and is the time shared between PLC 100 and field device 90.

Support device 500 provides a support tool that supports the user to operate system 1. The support tool includes a setting tool for preparation such as an execution environment of UPG 69 or a communication environment with PLC 100. For example, the support tool is provided to the user by a user interface (UI). Support device 500 can be connected to network 11, but may be incorporated in PLC 100.

In FIG. 2, for example, robot 900A connected to PLC 100A and robot 900B connected to PLC 100B operate in cooperation and are applied to machining of a workpiece 912. Specifically, in the machining process, when robot 900A picks workpiece 912 on a tray 911 with an arm and supports workpiece 912, supported workpiece 912 is manufactured with a machining kit provided at the distal end of the arm of robot 900B, and then robot 900A places workpiece 912 at a predetermined position.

In such a series of processes of pick→support→machining→place, UPG 69 corresponding to each process is executed while being switched, the control instruction output from each UPG 69 is given to robot controllers 90A, 90B of robots 900A, 900B that are the corresponding control targets, and robot controllers 90A, 90B operate according to the control instruction, so that the corresponding process is executed.

In system 1, a UPG (1) that outputs the control instruction of "pick", a UPG (2) that outputs the control instruction of "support", a UPG (3) that outputs the control instruction of "machining", and a UPG (4) that outputs the control instruction of "place" are exemplified as UPG 69 executed by PLC 100. In FIG. 2, because robot controller 90A that receives the control instructions "pick", "support", and "place" is connected to PLC 100A, in consideration of a communication delay (required communication time) of the control instruction, it is desirable that UPG (1), UPG (2), and UPG (4) are fixedly disposed in PLC 100A and executed by PLC 100A, and UPG (3) is fixedly disposed in PLC 100B and executed by PLC 100B in order to minimize the communication delay.

On the other hand, in system 1 of the embodiment, the data can be shared between the devices within the control period (more specifically, within the period of IO refresh 72) by applying the unified protocol to network 11 as described above, and thus, regarding the disposition of UPG 69 that outputs the control instruction of robot 900A or 900B, the UPG can be freely disposed in any PLC 100 without being conscious of the communication delay.

A setting tool 600 provided by support device 500 includes a disposition tool 63 and a schedule generation tool 64 in order to freely determine the disposition of UPG 69 between PLCs 100. Disposition tool 63 can determine to dispose (download) a plurality of control programs (UPGs 69) giving the control instruction to the same control target (robot 900A) to at least one of the plurality of control devices (PLCs 100).

For example, first, disposition tool 63 measures the communication delay time when UPG (1) is executed by each PLC 100, and determines PLC 100 having the minimum communication delay time as a load destination of UPG (1). Similarly, for each of remaining UPGs (2), (3), and (4), PLC 100 that is the load destination is determined based on the communication delay time. According to this determination, in FIG. 1, UPG (1) and UPG (2) are disposed in PLC 100A, UPG (3) is disposed in PLC 100B, and UPG (4) is disposed in PLC 100D. As described above, the plurality of UPGs (1), (2), and (4) giving the control instruction to the same control target are not fixed to PLC 100A, but can be disposed in PLCs 100A and 100D according to the communication delay time. A reference for the disposition is not limited to the communication delay time.

Schedule generation tool 64 is an example of the "arbitration module" that arbitrates the operation time (time to be executed) among the plurality of UPGs 69 such that update of the control instruction does not conflict between UPGs 69 having the command to calculate and update the same control instruction. Schedule generation tool 64 generates UPG schedule 65 that arbitrates the operation time during which UPG (1) to UPG (4) are executed such that the update of the control instruction by each UPG does not conflict with each other when UPGs (1) to (4) each having the command to calculate and update the same control instruction are executed. Generated UPG schedule 65 is given to each PLC 100.

PLC 100 executes the UPG disposed in itself according to generated UPG schedule 65. Accordingly, even when UPGs (1) to (4) are freely disposed, the control instruction can be given to the control target (robot controllers 90A, 90B) while avoiding the above-described conflict. In the embodiment, "update of the same control instruction conflicts with each other among the plurality of UPGs 69" indicates that the same control instruction is simultaneously updated (written) (or about to be updated) by the plurality of UPGs 69 by the execution of the plurality of UPGs 69.

As described above, in system 1 of the embodiment, because the above-described conflict is avoided, even when the user freely disposes UPG 69 in arbitrary PLC 100, the control instruction updated by the execution of each UPG 69 can be given to the control target while interference of the control instruction is avoided. In the embodiment, "interference" of the control instruction indicates a case where the plurality of control instructions of the same type are simultaneously given to the same control target. Accordingly, the user can dispose UPG 69 without being conscious of the conflict between UPGs 69 and the interference between the control instructions, and can obtain a high degree of freedom regarding the disposition of UPG 69.

(a1. Concept of Variable Manager)

In system 1 according to the embodiment, because UPG 69 can be disposed in any PLC 100, a variable manager is not PLC 100 but UPG 69 itself. A concept of the variable manager will be described.

UPG 69 of the embodiment is what is called a variable program. That is, UPG 69 is configured such that input data (field value), output data (control instruction), internal calculation data, and the like referred to by the program during the execution can be utilized using an input variable, an output variable, a temporary variable, and the like for each data. In the embodiment, the variable manager managing the input variables and the output variables is changed from PLC 100 to UPG 69. In the embodiment, the "variable manager" represents an entity having authority to rewrite a value of a variable.

This switching of the variable manager will be described. For example, the input variable in which the current position (field value) of the arm of robot 900A is set and the output variable in which a command value (control instruction) changing the position of the arm of robot 900A is set are referred to by UPG 69 that uses (declares) the variable. In the embodiment, UPG (1), UPG (2), and UPG (4) performing the "pick", the "support", and the "placing" read and write these variables using the input variable in which the current position (field value) of the arm of robot 900A is set and the output variable in which an instruction value (control instruction) changing the position of the arm of robot 900A is set such that the arm of robot 900A can be controlled. Accordingly, when UPG (1), UPG (2), and UPG (4) are sequentially executed according to UPG schedule 65 to implement "pick", "support", and "place", the "variable manager" of the output variable for which the command value (control instruction) is set is sequentially switched to UPG (1), UPG (2), and UPG (4) according to UPG schedule 65. As the variable manager is changed from PLC 100 to UPG 69 as described above, the identifier of the variable manager (UPG 69) is included in the control instruction in the embodiment. Consequently, whether the control target is a self-addressed control instruction can be determined based on the identifier of the variable manager of the control instruction.

B. Hardware Configuration of PLC 100

Figure 3:
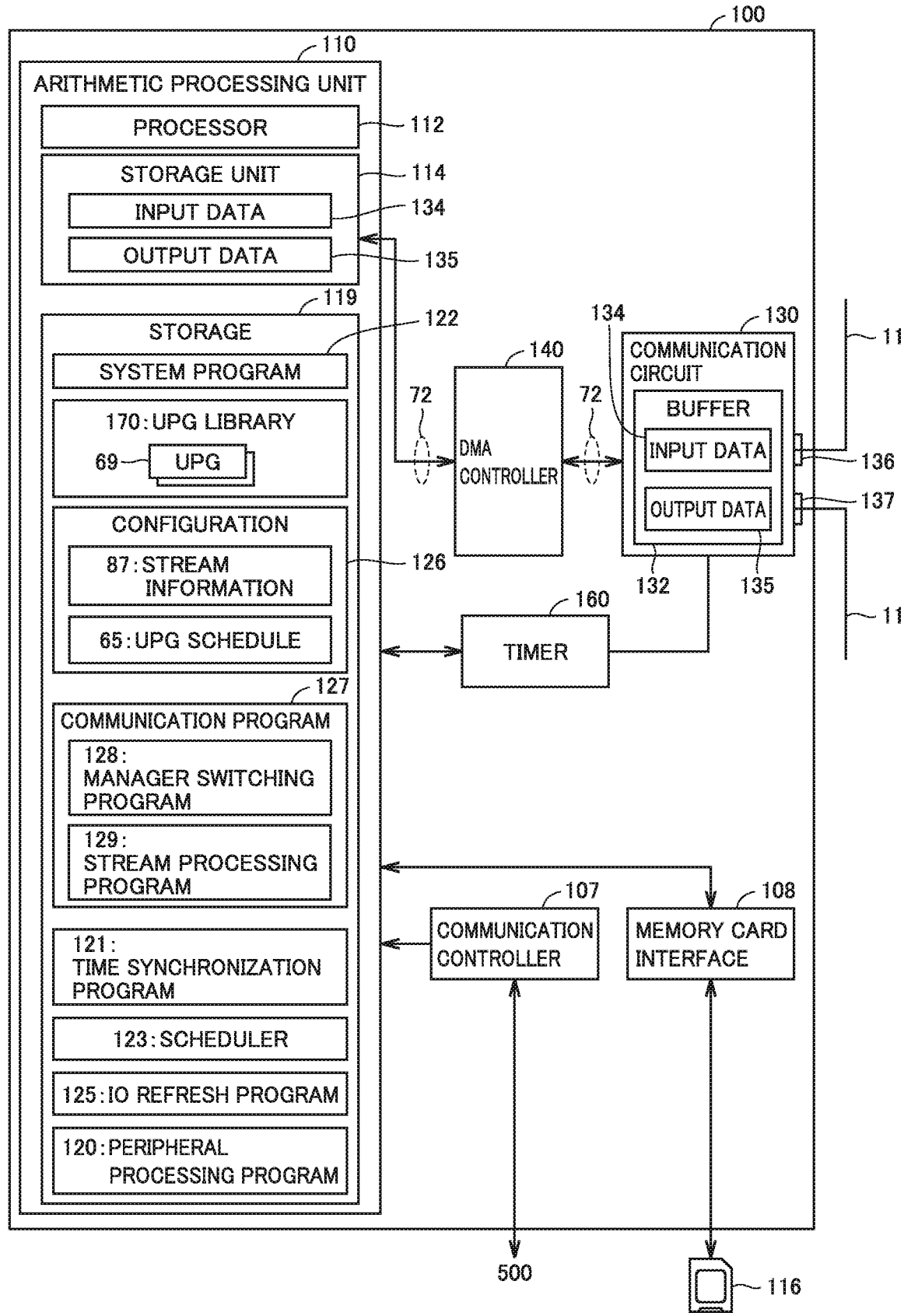
FIG. 3 is a schematic diagram illustrating a main part configuration of a PLC 100 of the embodiment.

FIG. 3 is a schematic diagram illustrating a main part configuration of PLC 100 of the embodiment. Referring to FIG. 3, PLC 100 includes an arithmetic processing unit 110, a communication circuit 130, a direct memory access (DMA) controller 140, a high-precision timer 160, a communication controller 107, communication ports 136 and 137 that connects network 11, and a memory card interface 108.

Arithmetic processing unit 110 includes a processor 112, a storage unit 114, and a storage 119. For convenience of description, PLC 100 includes only one processor 112, but a plurality of processors may be implemented. Each processor may have a plurality of cores. In arithmetic processing unit 110, processor 112 periodically executes one or a plurality of tasks. When the plurality of tasks are executed by arithmetic processing unit 110, priorities different from each other may be set for the plurality of tasks.

Processor 112 transfers a later-described communication frame 20 (for example, input data 134 and output data 135) stored in a later-described buffer 132 of communication circuit 130 to storage unit 114. Storage unit 114 includes a dynamic random access memory (DRAM), a static random access memory (SRAM), or the like, and provides a work area required for the execution of the program in processor 112.

Storage 119 includes a flash memory, a hard disk, or the like, and stores a peripheral processing program 120, a time synchronization program 121 performing the time synchronization, an IO refresh program 125, a system program 122, a scheduler 123, a UPG library 170 including one or the plurality of UPGs 69, a communication program 127, and a configuration 126. Storage 119 is an example of the "program storage".

System program 122 includes a library such as an operating system (OS) and a function that execute UPG 69 in processor 112. When being executed, IO refresh program 125 executes IO refresh 72. In IO refresh 72, the field value (input data) included in communication frame 20 received through communication circuit 130 is transmitted to arithmetic processing unit 110. IO refresh program 125 transmits a control instruction (output data) calculated by PLC 100 to field device 90. In this manner, IO refresh program 125 implements IO refresh 72 that transfers at least one of the input data and the output data.

UPG 69 is a program of the "control arithmetic processing" arbitrarily prepared depending on a machine or facility of the control target. Specifically, UPG 69 includes a control computation program having a command to calculate and update the control instruction based on input data 134 of storage unit 114 for the "sequence control" of the control target, and a motion program having the command to calculate and update the control instruction based on input data 134 for the "motion control" of robots 900A, 900B and the like. The motion control calculates the command value including numerical values such as a position, a speed, acceleration, and an angle with respect to an actuator such as a servo motor that becomes the control target. By the motion control, the servo motors related to the arms of robots 900A, 900B are controlled, and the arms operate according to the control instruction. The calculated values such as the control instruction by the control calculation processing of UPG 69 are stored in storage unit 114 as output data 135.

Communication program 127 generates communication frame 20 using output data 135 of storage unit 114, and controls communication circuit 130 so as to transmit and receive communication frame 20. The communication program 127 includes a manager switching program 128 transmitting a later-described manager switching notification 31, and a stream processing program 129 performing stream processing.

Peripheral processing program 120 is processing different from the control arithmetic processing and the like executed by UPG 69, is processing executed around the control arithmetic processing, and includes, for example, logging processing of communication frames 20 exchanged through network 11.

Scheduler 123 is a program that manages resource allocation, execution timing, and the like according to priority with respect to the process, task, and the like of PLC 100. Such a process or task includes a process or task that can be generated by processor 112 executing peripheral processing program 120, UPG 69, IO refresh program 125, time synchronization program 121, communication program 127, and the like. Scheduler 123 adjusts the execution timing of each program in a period based on a predetermined control period, for example, according to time-synchronized timer 160. Thus, PLC 100 can cyclically perform the control arithmetic processing and the IO refresh 72 in the period based on the time synchronized with another PLC 100 and with field device 90.

Configuration 126 includes various setting values required for program execution in PLC 100 and various setting values defining a network configuration. For example, configuration 126 includes a UPG schedule 65 generated by support device 500.

Communications controller 107 receives UPG 69 or UPG schedule 65 through network 11 or another communication path. Memory card interface 108 is configured such that memory card 116 is detachable, and can write and read various data (such as a user program and data) in and from memory card 116. UPG 69 or UPG schedule 65 may be loaded from memory card 116 to storage 119.

Communication circuit 130 connects communication ports 136 and 137 that physically connect network 11. For example, although not limited to, communication port 136 is connected to network 11 connected to the side of another PLC 100, and communication port 137 is connected to network 11 connected to the side of field device 90. Communication circuit 130 exchanges communication frame 20 with another device through communication port 136, 137. Communication circuit 130 includes a buffer 132 that temporarily stores communication frame 20 transmitted and received through network 11. For example, communication frame 20 temporarily stored in buffer 132 includes input data 134 and output data 135.

For example, communication circuit 130 transmits and receives communication frame 20 as follows. In accordance with an instruction from processor 112, communication circuit 130 copies communication frame 20 based on output data 135 from storage unit 114 through a DMA controller 140, stores the copy in buffer 132 as output data 135, and transmits communication frame 20 onto network 11.

Furthermore, in accordance with the instruction from processor 112, communication circuit 130 copies communication frame 20 arriving (received) from network 11, stores the copy in buffer 132 as input data 134, and outputs communication frame 20 to arithmetic processing unit 110. Communication frame 20 is stored in storage unit 114 as the input data.

The data of transmitted and received communication frame 20 may be accumulated in storage unit 114 over a period longer than the control period, or only the data of communication frame 20 in the latest control period may be accumulated.

In the embodiment, "IO refresh 72" executed by PLC 100 includes at least one of the transmission of output data 135 (communication frame 20) to another device and the reception of input data 134 from another device. In "IO refresh 72", input data 134 corresponds to communication frame 20 of the field value collected and transferred by field device 90, and output data 135 corresponds to communication frame 20 of the control instruction calculated by the control arithmetic processing of UPG 69 of PLC 100.

DMA controller 140 is connected to arithmetic processing unit 110 and communication circuit 130, and has a function of enhancing the data access between arithmetic processing unit 110 and communication circuit 130. Thus, the IO refresh processing time can be shortened and a jitter of the transmission timing can be reduced.

For convenience of description, the configuration in which arithmetic processing unit 110, communication circuit 130, and DMA controller 140 are distinguished from each other is illustrated in the configuration of FIG. 3. However, the configuration is not limited thereto, but an arbitrary implementation form can be adopted. For example, the configuration may be configured by a system on chip (SoC) on which all or a part of arithmetic processing unit 110 and all or a part of communication circuit 130 is mounted on the same chip. Alternatively, the SoC in which processor 112 of arithmetic processing unit 110 and the main function of DMA controller 140 are mounted on the same chip may be used. These implementation forms can be appropriately selected.

C. Hardware Configuration of Field Device 90

Figure 4:
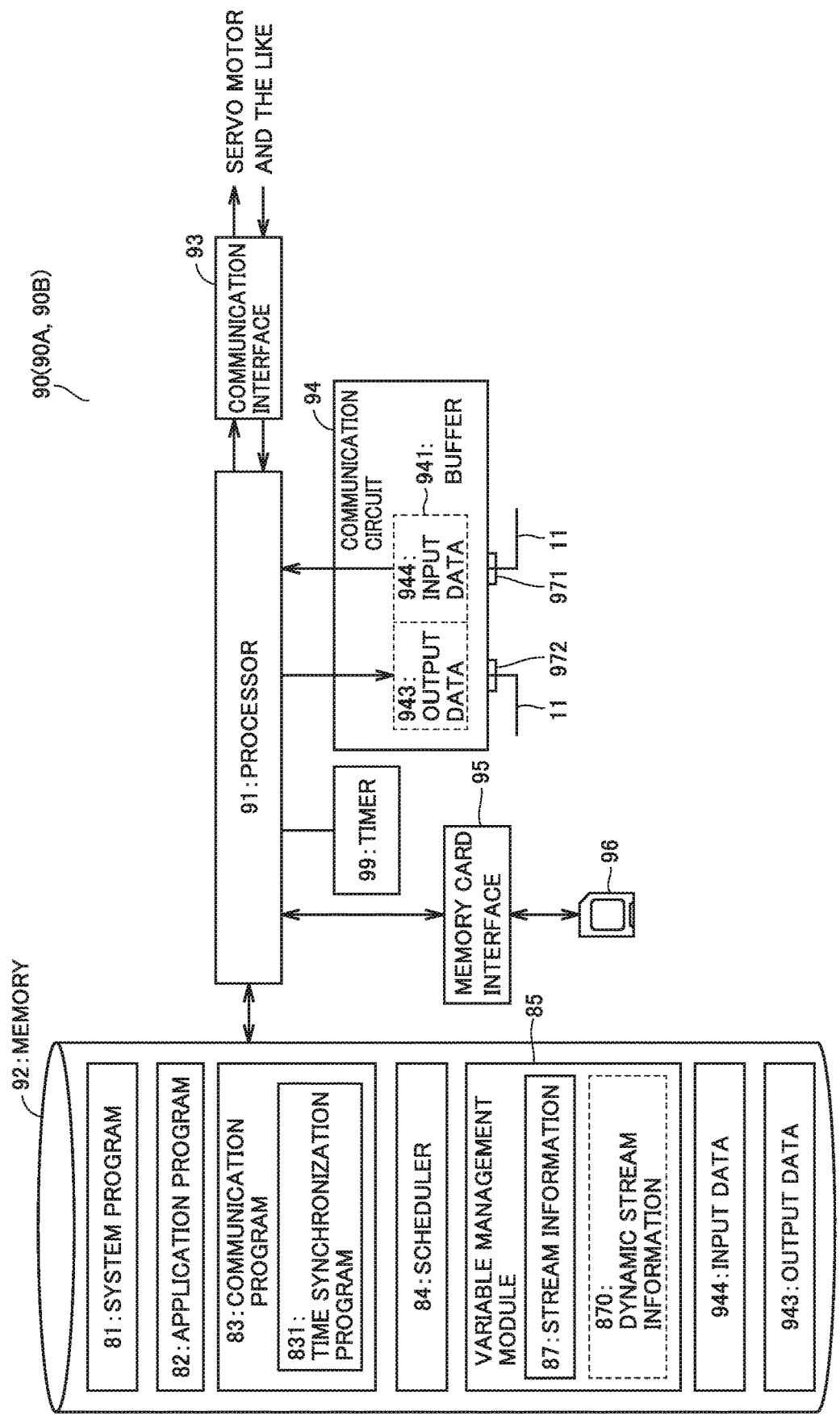
FIG. 4 is a view schematically illustrating a main part configuration of a field device 90 of the embodiment.

FIG. 4 is a view schematically illustrating a main part configuration of field device 90 of the embodiment. The configuration in FIG. 4 can also be applied to robot controllers 90A, 90B. Referring to FIG. 4, field device 90 includes a processor 91, a memory 92, a communication interface (I/F) 93 that connects a servo motor and the like, a communication circuit 94 that connects network 11, a timer 99 having the same configuration as timer 160 of PLC 100, and a memory card interface 95 to which the memory card 96 is detachably attached. Such a device may not include a function and a circuit handling memory card 96. Accordingly, field devices 90 may also include the device that do not include the function and circuit associated with memory card 96.

In accordance with the instruction from processor 91, communication IN 93 receives the field value from the control target and transmits the control instruction from processor 91 to the control target. Thus, the control target is controlled according to the instruction value and the control amount, and outputs the field value that is the result.

Communication circuit 94 includes communication ports 971 and 972 that physically connect network 11. Communication circuit 94 exchanges communication frame 20 with another device through communication ports 971, 972. Although not limited, communication port 971 connects network 11 connected to the side of PLC 100, and communication port 972 connects network 11 connected to the side of field device 90.

Communication circuit 94 includes a buffer 941 that temporarily stores communication frame 20 transmitted and received through network 11. For example, communication frame 20 is temporarily stored in buffer 941 as input data 944 or output data 943.

Memory 92 includes a flash memory, a hard disk, a DRAM, an SRAM, or the like, and provides the work area necessary for the execution of the program in processor 91. Memory 92 stores a system program 81, an application program 82 including the program operating the control target (servo motor, robot) connected to field device 90, a communication program 83, a scheduler 84 periodically executing the program, a variable management module 85 including later-described stream information 87 or dynamic stream information 870, output data 943, input data 944, and the like. Output data 943 and input data 944 correspond to communication frame 20. Memory 92 can store the program or data from support device 500 through PLC 100 or from memory card 96 through memory card interface 95.

Communication program 83 is a program that controls communication I/F 93 and communication circuit 94. Communication program 83 includes a time synchronization program 831 that performs time synchronization.

In accordance with the instruction from processor 91, communication circuit 94 copies communication frame 20 of output data 943 of memory 92, stores the copy in buffer 941 as output data 943, and transmits communication frame 20 to network 11. In addition, communication circuit 94 receives communication frame 20 arriving from network 11 according to the instruction of processor 91, copies communication frame 20, and stores the copy in buffer 941 as input data 944. Processor 91 stores input data 944 of communication frame 20 in memory 92.

D. Hardware Configuration of Support Device 500

Figure 5:
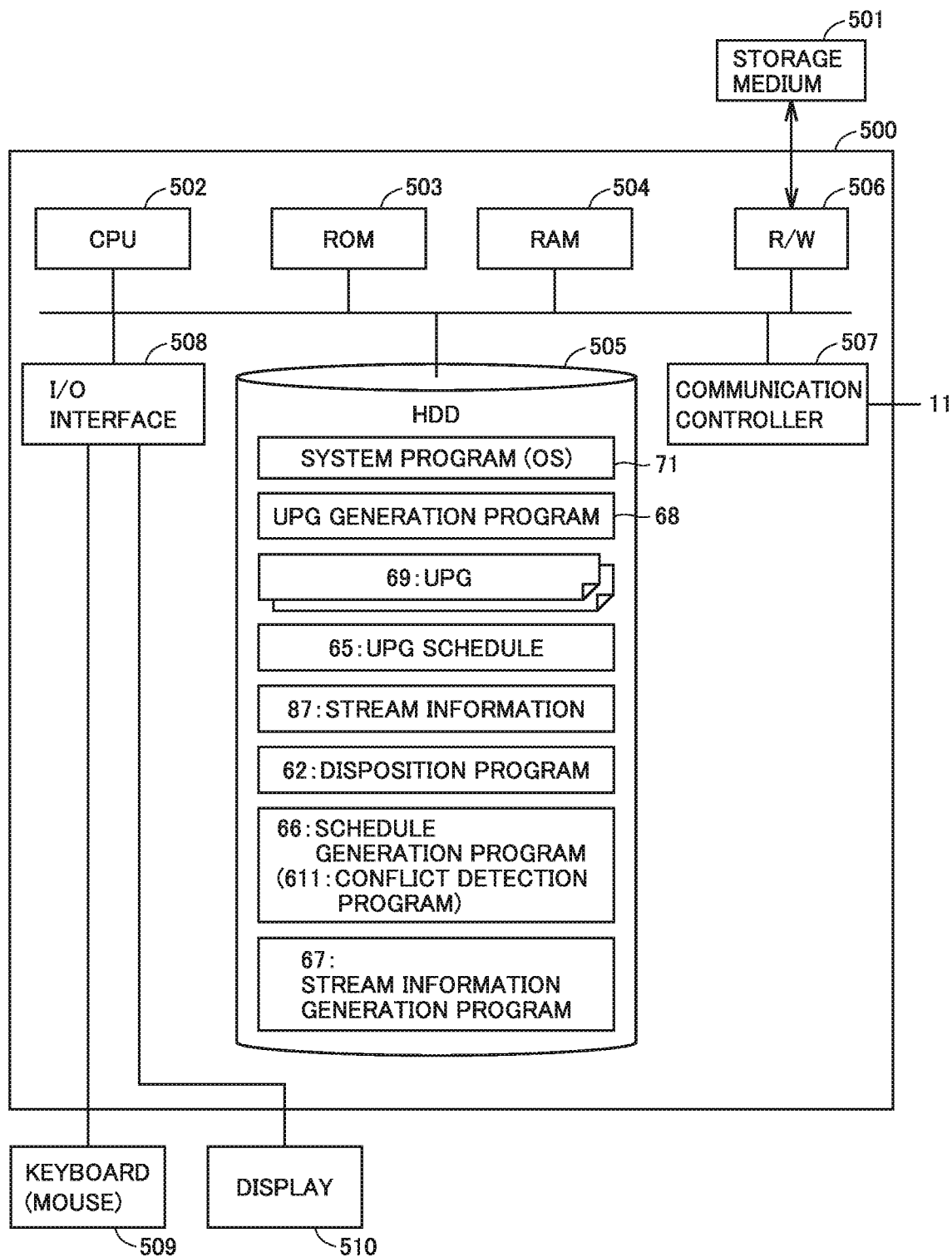
FIG. 5 is a view schematically illustrating a configuration of a support device 500 of the embodiment.

FIG. 5 is a view schematically illustrating a configuration of support device 500 of the embodiment. Referring to FIG. 5, support device 500 is a computer system that includes a central processing unit (CPU) 502 and a storage unit that stores a program and data and operates according to the program. The storage unit includes a read only memory (ROM) 503, a random access memory (RAM) 504, and a hard disk drive (HDD) 505. Support device 500 further includes a communication controller 507 and an input and output (I/O) interface 508. Support device 500 further includes a keyboard 509 and a display 510. Keyboard 509 receives the input including an instruction from the user to support device 500. In order to receive the input, support device 500 may include another device such as a mouse.

Display 510 includes a liquid crystal display (LCD) or an organic electro luminescence (EL), and displays a video or an image according to a video signal or an image signal output from support device 500. Support device 500 includes a reader and writer (R/W) device 506 to which an external storage medium 501 is detachably attached, R/W device 506 reading and writing the program and/or the data from and to attached storage medium 501.

Communication controller 507 controls communication between support device 500 and an external device through network 11. For example, communication controller 507 includes a network interface card (NIC). I/O interface 508 controls data exchange between CPU 502, keyboard 509, and display 510.

HDD 505 includes a system program 71 including an OS, a UPG generation program 68 generating UPG 69, one or the plurality of generated UPGs 69, UPG schedule 65, stream information 87, a disposition program 62 determining the disposition of UPG 69, a schedule generation program 66 generating UPG schedule 65, and a stream information generation program 67 generating stream information 87. Schedule generation program 66 includes a conflict detection program 611 that determines whether there is a conflict of the variable manager in UPG schedule 65. The conflict of the variable managers will be described later. When schedule generation program 66 is activated, a schedule generation tool 64 is provided.

UPG generation program 68 includes an editor that edits (generates) UPG 69 according to a user operation received from keyboard 509, a compiler that compiles edited UPG 69, and a builder that converts UPG 69 into an executable format. The builder may include a compiling function.

E. Configuration of Communication Frame 20

Figure 6:
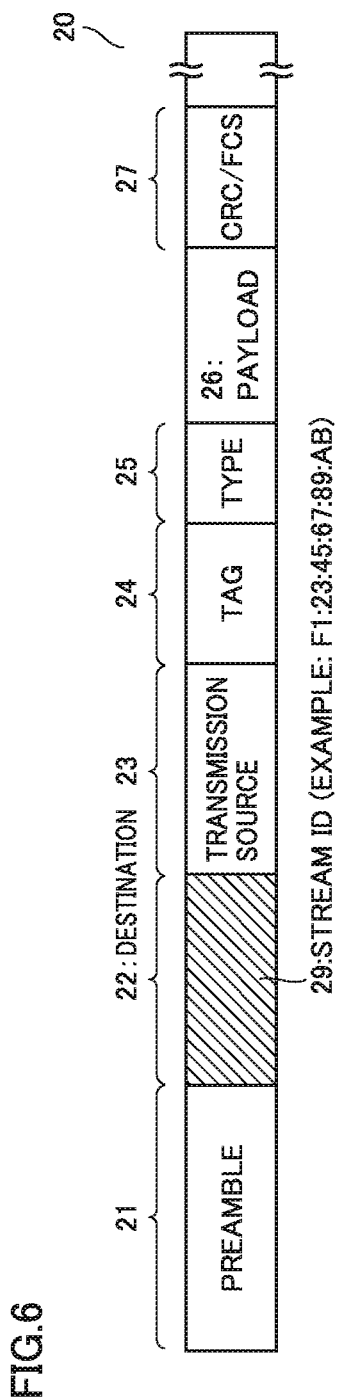
FIG. 6 illustrates an example of a basic communication frame 20.
Figure 7:
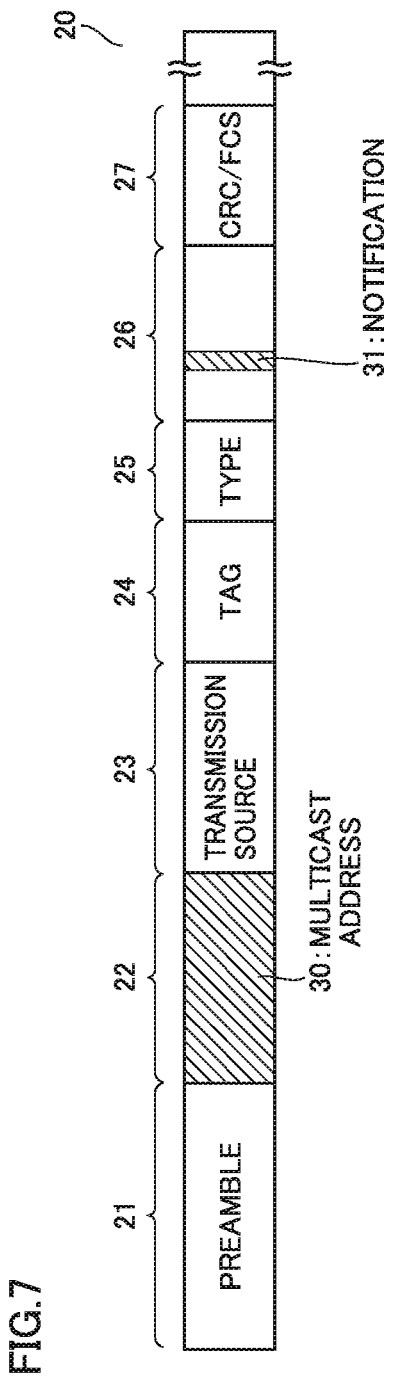
FIG. 7 illustrates an example of the communication frame 20 transmitting a notification 31 switching a "variable manager" of variable management.

FIGS. 6 and 7 are views schematically illustrating a configuration example of communication frame 20 of the embodiment. FIG. 6 illustrates an example of basic communication frame 20, and FIG. 7 illustrates an example of communication frame 20 transmitting notification 31 of switching the "variable manager" of the variable management.

(e1. Basic Communication Frame)

Referring to FIG. 6, basic communication frame 20 includes an area 21 for storing a preamble, an area for storing a destination 22 of the frame, an area 23 for storing the transmission source of the frame, an area 24 of a tag, an area 25 for storing a type of a network, and an area 27 for error correction, and an area for storing a payload 26 that is a data body to be transferred. Destination 22 of communication frame 20 and the transmission source of area 23 include information uniquely identifying each device, for example, a media access control address (MAC). In the case of basic communication frame 20 in FIG. 6, for example, payload 26 includes input data 134, 944 corresponding to the field value or output data 135, 943 corresponding to the control instruction.

Figure 8:
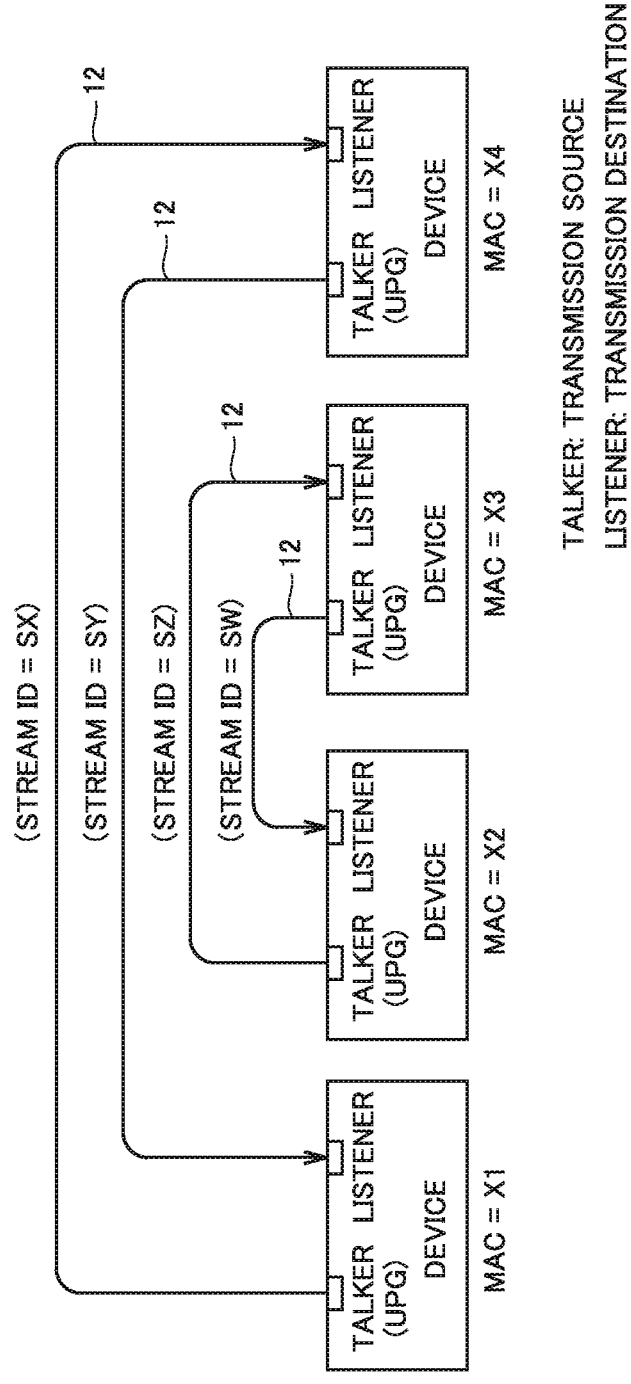
FIG. 8 is a view illustrating a stream ID 29 of the embodiment.

The region of destination 22 includes a stream identifier (ID) 29 managing the transfer of communication frame 20. FIG. 8 is a view illustrating stream ID 29 of the embodiment. In the embodiment, communication frame 20 transferred on network 11 is managed in units of flow 12. As illustrated in FIG. 8, the device connected to network 11 can be a transmission source (TALKER) or a transmission destination (LISTENER) of communication frame 20. Each flow 12 is assigned a stream ID defined by a set of an identifier of TALKER and an identifier of LISTENER.

In the embodiment, in the case where payload 26 is the control instruction, the identifier of UPG 69 that is the transmission source of payload 26 (control instruction) is allocated to TALKER, and a MAC address of the transmission destination device (field device 90) is allocated to LISTENER. In the embodiment, in the case where payload 26 is the field value, the MAC address of the transmission source device is allocated to TALKER, and the MAC address of the transmission destination device is allocated to LISTENER. Consequently, each device can uniquely identify each communication frame 20 to be exchanged based on stream ID 29.

(e2. Payload of Communication Frame 20)

For example, control-system data can be stored as payload 26 in communication frame 20 in FIG. 6. The area of payload 26 includes an area for storing the field value in the control-system data and an area for storing the control instruction in the control-system data.

When reading and writing the area of payload 26, for example, each field device 90 specifies a position in the area of payload 26 based on an offset (for example, the offset from a head of communication frame 20) individually allocated to the device, and reads and writes the data at the specified position. Specifically, communication program 83 reads the command value and the controlled variable (input data 944 or output data 135) from the position based on the offset of the own device in the area of payload 26 of incoming communication frame 20, and writes the field value (output data 943 or input data 134) to the position based on the offset of the area of payload 26 of the communication frame 20 to be transmitted.

On the other hand, PLC 100 stores offset information assigned to each field device 90. Therefore, PLC 100 can read the field value (output data 943 or input data 134) of each field device 90 from the area of payload 26 of incoming communication frame 20 based on the offset information, and write the control instruction (input data 944 or output data 135) to the offset position of each field device 90 in the area of payload 26 of communication frame 20 to be transmitted based on the offset information.

Thus, PLC 100 can read and write the control system data of each field device 90 in the area of payload 26 of communication frame 20, and each field device 90 can read and write the control system data of the own device in the area of payload 26 of communication frame 20.

(e3. Communication Frame of Notification 31 of Switching "Variable Manager")

Referring to FIG. 7, in communication frame 20, for example, the MAC address of the device of the transmission source (TALKER) of notification 31 is stored in area 23, a multicast address 30 is stored as the transmission destination (LISTENER) of notification 31 in an area of destination 22, and a payload including notification 31 indicating that the "variable manager" is switched is stored in the area of payload 26. In the embodiment, because the multicast address is stored in the region of destination 22, the device (PLC 100 or field device 90) connected to network 11 can receive communication frame 20 in which notification 31 in FIG. 7 is stored and detect the switching of the "variable manager" from notification 31.

F. Support Tool

The support tool provided by support device 500 will be described. First, the generation of UPG 69 and the processing of generating UPG schedule 65 and stream information 87 executed in each process will be described.

(f1. Generation Processing)

Figure 9:
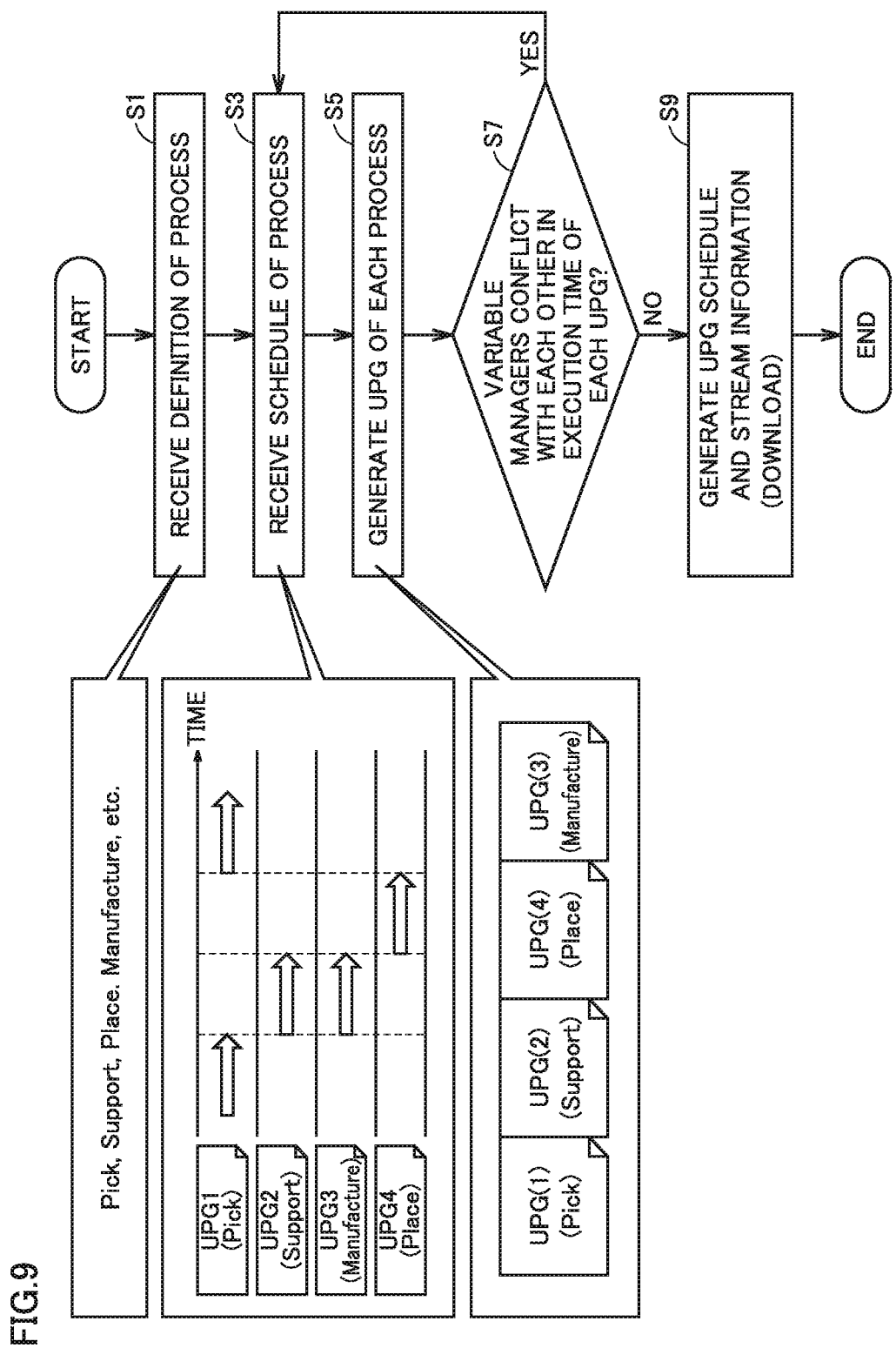
FIG. 9 is a flowchart schematically illustrating processing of arbitrating a setting tool 600 of the embodiment.
Figure 14:
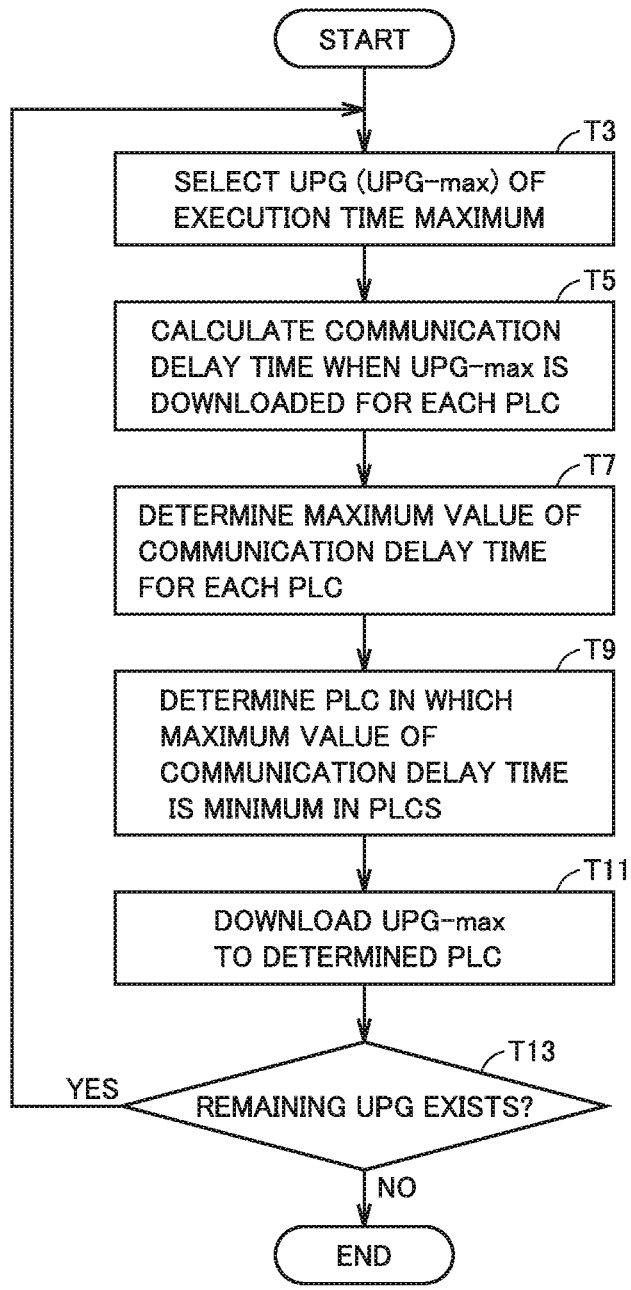
FIG. 14 is a flowchart illustrating an example of processing of disposing a UPG 69 of the embodiment.

FIG. 9 is a flowchart schematically illustrating processing of arbitrating setting tool 600 of the embodiment. Setting tool 600 executes a step of disposing a plurality of control programs (UPGs 69) giving the control instruction to the same control target (field device 90) in at least one of the plurality of PLCs 100 and a step (S1 to S7) of arbitrating an operation time between the plurality of control programs such that the control instructions from the control programs do not interfere with each other. Referring to FIG. 14, the disposing step will be described later.

Figure 10:
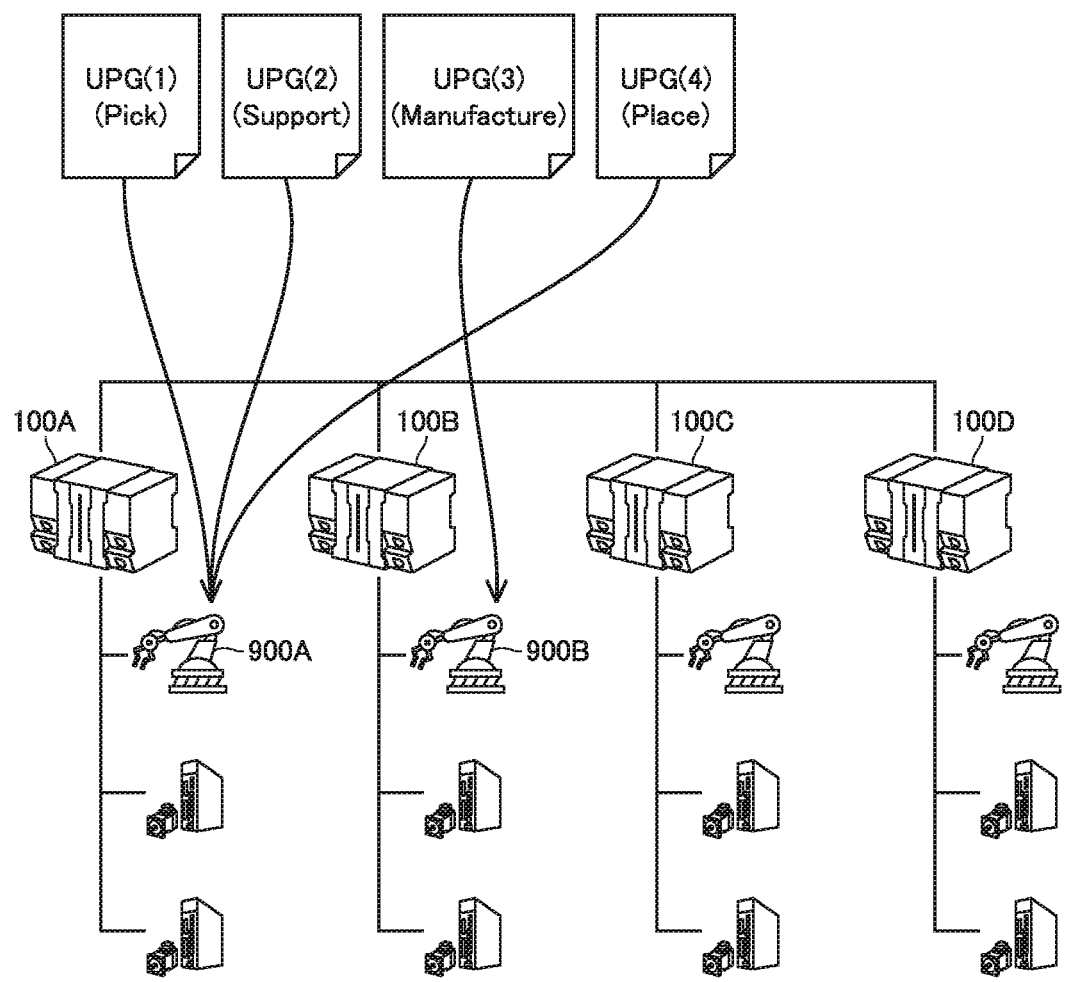
FIG. 10 is a view illustrating an example of a UPG schedule 65 of the embodiment.
Figure 11:
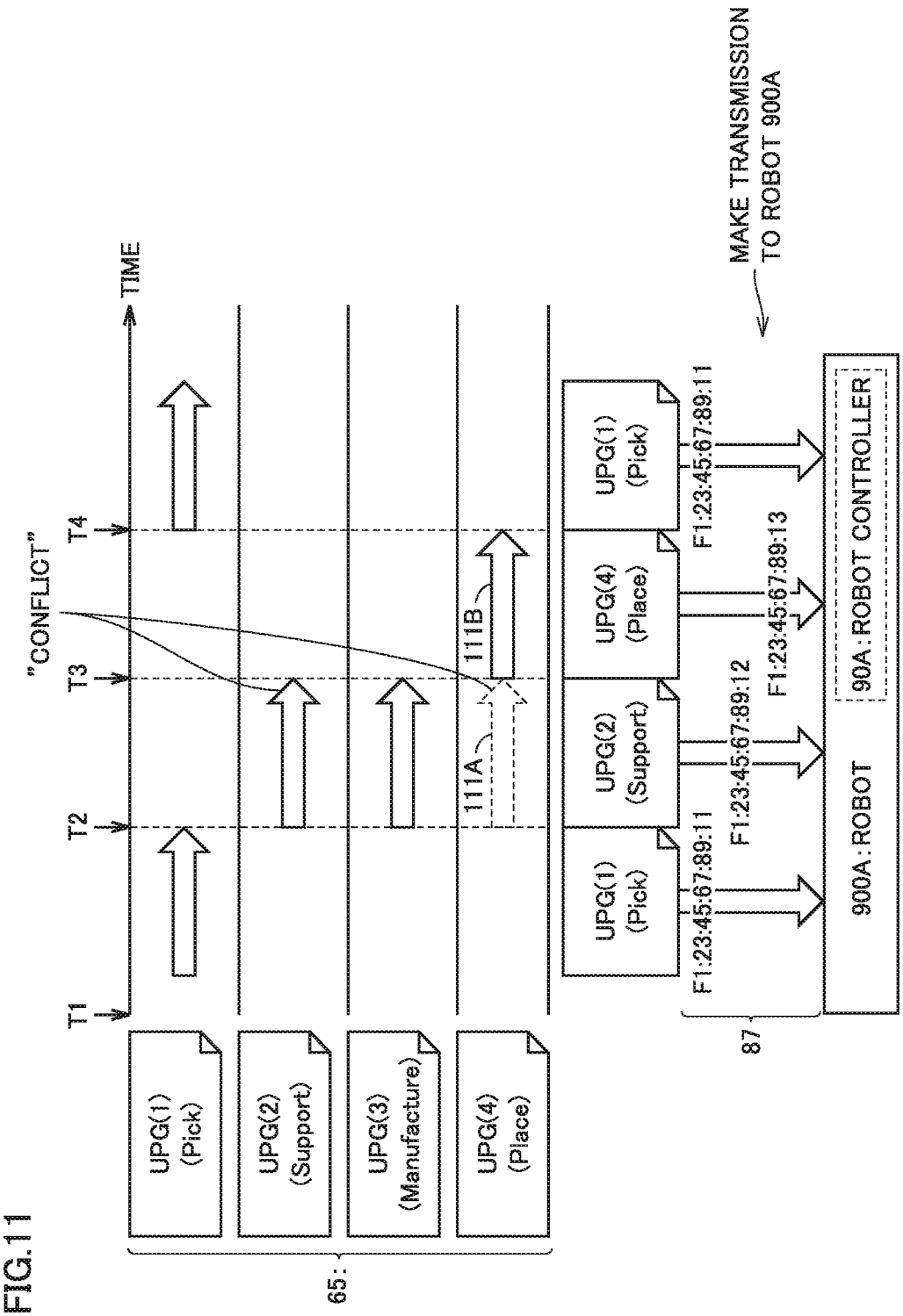
FIG. 11 is a view illustrating an example of the UPG schedule 65 of the embodiment.

When UPG generation program 68 of support device 500 is activated, UPG generation program 68 receives a definition of a process from the user operation through keyboard 509 (step S1). For example, "pick", "support", "place", and "manufacture" are received as the definition of the process. FIGS. 10 and 11 are views illustrating an example of UPG schedule 65 of the embodiment. For example, in step S1, as illustrated in FIG. 10, among the processes pick, support, manufacture, and place, the processes pick, support, and place are allocated to the control target (robot 900A), and the process manufacture is allocated to the control target (robot 900B).

Schedule generation program 66 is activated, and schedule generation program 66 receives the schedule performing the process defined in step S1 from the user operation through keyboard 509 (step S3). For example, the schedule indicates the order of the execution of UPG 69 (the time when each UPG 69 is executed, the timing of the execution, and the like).

UPG generation program 68 generates UPG 69 corresponding to each process defined in step S1 from the user operation through keyboard 509 (step S5). Thus, UPGs (1) to (4) are generated as UPG 69 and stored in HDD 505.

Conflict detection program 611 of schedule generation program 66 determines whether the variable manager conflicts between UPG 69 and another UPG at the time when each UPG 69 is executed based on the schedule received from the user in step S3 (step S7). That is, it is determined whether the arbitration is required.

When determining that the variable manager is in conflict (YES in step S7), conflict detection program 611 displays information prompting the user to set the schedule resolving the conflict through display 510, and returns to step S3. In step S3, schedule generation program 66 can receive the schedule resolving the conflict from the user.

When conflict detection program 611 determines that the variable manager does not conflict (NO in step S7), schedule generation program 66 generates UPG schedule 65 without conflict according to the user operation received in step S3, and stream information generation program 67 generates stream information 87 in FIG. 11 (step S9). Support device 500 stores generated UPG schedule 65 and stream information 87 in HDD 505 or transfers (downloads) generated UPG schedule 65 and stream information 87 to PLC 100 and field device 90.

(f2. Detection of Variable Manager Conflict and Arbitration of Operation Time)

In the embodiment, in the case where there are at least two variable managers (UPGs 69) corresponding to one output variable to which the control instruction (instruction value) given to the same controlled object is set, overlapping of the operation times of this at least two UPGs 69 (for example, the at least two UPGs 69 are executed at the same time) is referred to as "conflict of variable managers". In the case of "the conflict of the variable managers", a situation in which the plurality of UPGs 69 having the command to calculate and update the same control instruction update the same control instruction in conflict with each other occurs. Accordingly, in the embodiment, the situation in which the plurality of UPGs 69 update the same control instruction in conflict with each other can be avoided by avoiding "the conflict of the variable managers". For example, in UPG schedule 65 of FIG. 11, the time when UPG (4) indicated by a broken-line arrow is executed overlaps the time when UPG (2) is executed, and the "conflict of the variable managers" is generated between UPG (2) and UPG (4).

Conflict detection program 611 detects the presence or absence of the "conflict of the variable manager" from UPG schedule 65. Specifically, conflict detection program 611 extracts an output variable name used (declared) in UPG 69 from each UPG 69 generated in step S5. Then, conflict detection program 611 determines whether there are at least two UPGs 69 using (declaring) a common variable name in the extracted output variable names among UPGs 69 generated in step S5. Conflict detection program 611 determines whether the times (processes) during which at least two UPGs 69 are executed are the same (overlap) in UPG schedule 65. When conflict detection program 611 determines that the execution times of at least two UPGs 69 are the same (overlap), conflict detection program 611 detects "the conflict of the variable manager".

In the case where UPG 69 is executed according to UPG schedule 65 in which the variable manager is in conflict, a plurality of control instructions corresponding to the same output variable is simultaneously given to the same control target, and the control instructions interfere with each other. When the "interference" occurs, the control target to which an interfering control instruction is given cannot determine which control instruction should be followed, and sometimes malfunctions.

Accordingly, in the embodiment, in order to prevent the "interference" of the control instruction, when conflict detection program 611 detects "the conflict of the variable managers" at the time in which schedule generation program 66 generates UPG schedule 65, schedule generation program 66 generates (changes) UPG schedule 65 such that "the conflict of the variable manager" is resolved based on the user operation or the like. For example, the time during which UPG (4) in FIG. 11 is executed is changed from the time indicated by an arrow 111A to the time indicated by an arrow 111B. In this manner, schedule generation tool 64 (schedule generation program 66) can statically determine the operation times of the plurality of UPG schedules 65 such that the control instructions from UPG schedules 65 do not interfere with each other.

Consequently, even when UPG 69 is freely disposed in arbitrary PLC 100 by disposition tool 63 (disposition program 62), because schedule generation tool 64 generates UPG schedule 65 without "the conflict of the variable manager", PLC 100 can execute UPG 69 according to UPG schedule 65 while arbitrating the operation time among the plurality of UPGs 69 such that the control instructions from respective UPGs 69 do not interfere with each other.

G. Example of UPG Schedule 65 and Stream Information 87

Figure 12:
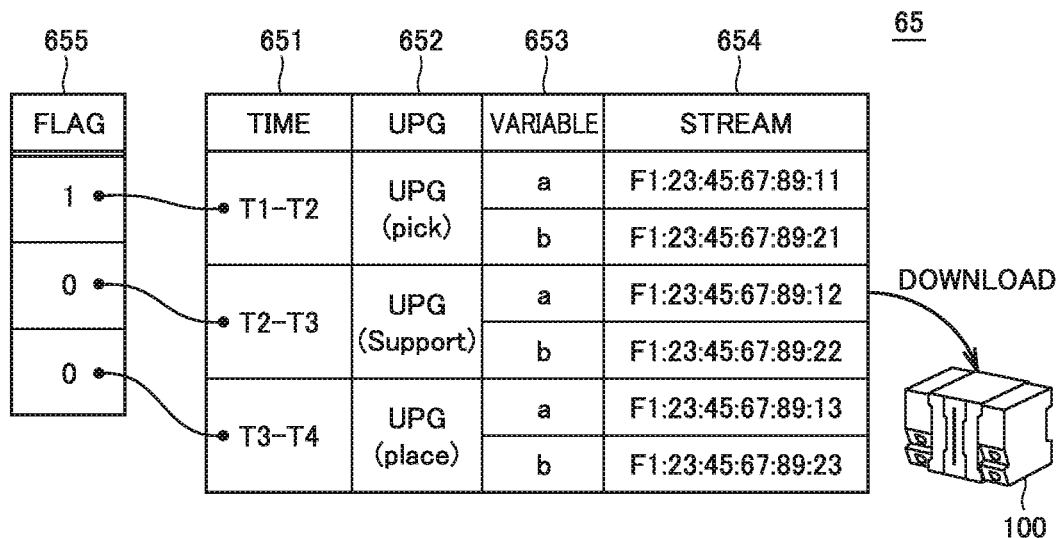
FIG. 12 is a view schematically illustrating an example of the UPG schedule 65 of the embodiment.

FIG. 12 is a view schematically illustrating an example of UPG schedule 65 of the embodiment. For example, UPG schedule 65 in FIG. 12 includes information about UPG (1), UPG (2), and UPG (4), and UPG (1), UPG (2), and UPG (4) use the same output variable (a, b) in which the control instruction is set. Referring to FIG. 12, UPG schedule 65 includes, for each UPG 69, an execution time 651 corresponding to the order in which UPG 69 operates, an identifier 652 of UPG 69, an output variable 653 used in UPG 69, and a stream ID 654 identifying communication frame 20 that transfers the control instruction set to the output variable 653. Stream ID 654 is defined corresponding to each output variable for each corresponding UPG. UPG schedule 65 also includes a flag 655 associated with each UPG 69. Flag 655 is set to 0 when corresponding UPG 69 does not operate (not execute), and flag 655 is set to 1 during the operation (execution).

As illustrated in FIG. 12, schedule generation program 66 arbitrates the operation time of time 651 such that each of the plurality of UPG schedules 65 operates in order according to the progress of the process in the case where the plurality of UPG schedules 65 is distributed and disposed in the plurality of PLCs 100 in UPG schedule 65.

FIG. 12 illustrates UPG schedules 65 of UPG (1), UPG (2) and UPG (4) of robot 900A, and UPG schedule 65 of UPG (3) of robot 900B has a similar configuration. According to UPG schedule 65 of FIG. 12, each PLC 100 can arbitrate the operation time among the plurality of UPGs 69 such that the control instructions from UPGs 69 do not interfere with each other.

When UPG schedule 65 is generated, stream information generation program 67 generates stream information 87 corresponding to identification information in which field device 90 that is the control target identifies the control instruction addressed to the field device itself.

Figure 13:
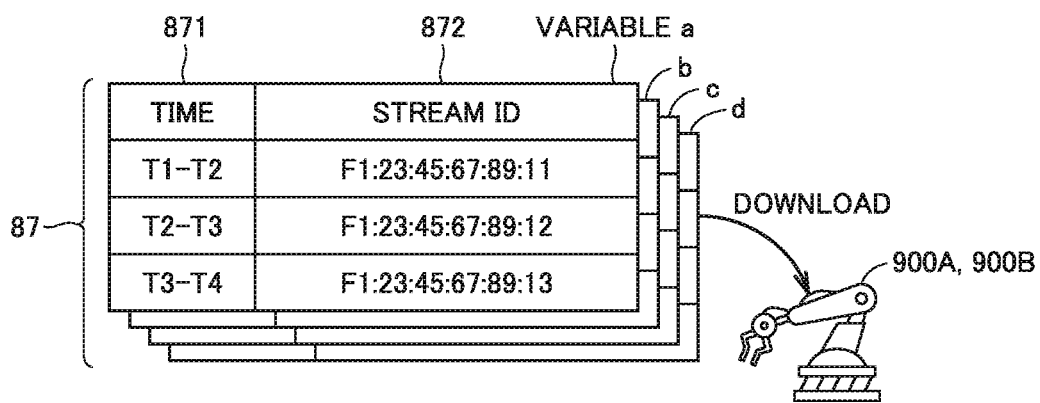
FIG. 13 is a view schematically illustrating an example of stream information 87 of the embodiment.

FIG. 13 is a view schematically illustrating an example of stream information 87 of the embodiment. Referring to FIG. 13, stream information 87 is information extracted from UPG schedule 65, and is generated corresponding to each of output variables 653 of UPG schedule 65. Stream information 87 corresponding to each variable includes a set including a time 871 and a stream ID 872 for each UPG 69 calculating the control instruction of the variable. Each set includes time 871 at which UPG 69 is operated (executed) and stream ID 872 of communication frame 20 of the variable. Time 871 corresponds to time 651 of UPG schedule 65 and stream ID 872 corresponds to stream ID 654 of UPG schedule 65. Stream information 87 is transferred (downloaded or the like) to the control target (robot controllers 90A, 90B of robots 900A, 900B).

Stream information 87 includes information in which field device 90 determines when, from which UPG 69, which variable is received, time 871, and stream ID 872. Time 871 indicates a concept including the order in which the plurality of control instructions are given to field device 90 when the plurality of control instructions are given to field device 90. This order is based on the operation times (Time T1-T2, Time T2-T3, Time T3-T4) arbitrated among the plurality of UPG schedules 65 that output the plurality of control instructions.

Stream ID 872 includes the identifier of UPG 69 and the identifier of the control instruction. The identifier of the control instruction includes a type of the control instruction, and the type of the control instruction includes a value of the variable (more specifically, the variable in which the control instruction is written) accessed by UPG 69 during the operation of UPG 69.

Field device 90 collates stream ID 29 of communication frame 20 received at time 871 indicated by stream information 87 with stream ID 872 corresponding to time 871. when stream ID 29 and stream ID 872 are not matched with each other, field device 90 can discard communication frame 20 (that is, the control instruction). As a result, field device 90 can extract communication frame 20 having the control instruction calculated by designated UPG 69 from communication frame 20 transmitted onto network 11 at the time designated according to UPG schedule 65. Accordingly, in the embodiment, UPG 69 is freely disposed in arbitrary PLC 100, and even in this case, field device 90 can certainly avoid the malfunction due to the "interference" of the control instruction.

H. Disposition of UPG 69

Figures 15, 16:
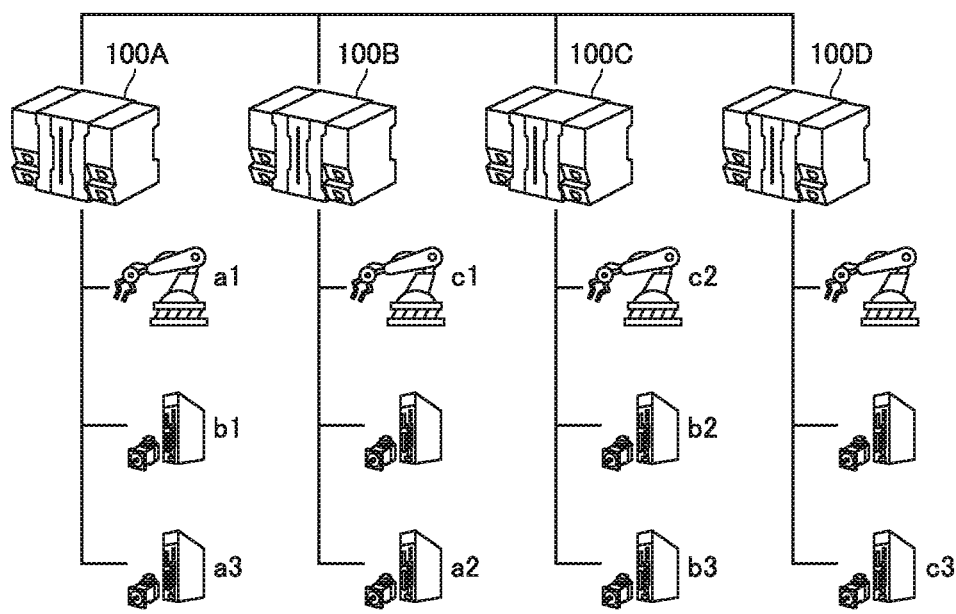
FIG. 15 is a view illustrating an example of information 150 about the UPG 69 of the embodiment.
FIG. 16 is a view illustrating a field device 90 that operates according to a control instruction of a variable 153 in FIG. 15.

FIG. 14 is a flowchart illustrating an example of processing of disposing UPG 69 of the embodiment. FIG. 15 is a view illustrating an example of information 150 about UPG 69 of the embodiment. Corresponding to each UPG 69 to be disposed, information 150 in FIG. 15 includes an identifier 151, an execution time 152 required for the execution of UPG 69, and a variable 153 of the control instruction output by UPG 69. Information 150 is stored in HDD 505 of support device 500.

FIG. 16 is a view illustrating field device 90 that operates according to the control instruction of variable 153 in FIG. 15. FIG. 16 illustrates an example in which each of variables 153 of UPG 69 in FIG. 15 corresponds to the control instruction given to which field device 90. According to the flowchart in FIG. 14, as illustrated in FIG. 10, a plurality of control programs (UPG (1), UPG (2) and UPG (4)) giving the control instruction to the same control target (robot controller 90A) can be arbitrarily disposed in at least one of the plurality of control devices (PLC 100).

Referring to FIGS. 15 and 16, the processing according to the flowchart in FIG. 14 will be described. When disposition program 62 is activated, disposition tool 63 operates. Disposition tool 63 selects UPG 69 (herein, referred to as UPG-max) corresponding to identifier 151 having the maximum execution time from UPGs 69 of HDD 505 (step T3).

For example, in the case of execution time 152 in FIG. 15, disposition tool 63 selects UPG (3) as UPG-max according to (t1<t2<t3).

Disposition tool 63 downloads the selected UPG-max to each PLC 100, and each PLC 100 executes the downloaded UPG-max, calculates (measures) the communication delay time, and transmits the calculated communication delay time to support device 500 (step T5). After calculating the communication delay time, PLC 100 deletes the downloaded UPG-max.

For example, when the UPG-max is downloaded to each PLC 100, the maximum value of the communication delay time of each variable is calculated as the calculation of the communication delay time. At this point, the communication delay time between adjacent devices through network 11 is set to 1 step.

When the UPG-max is downloaded to PLC 100A, the communication delay times of variables a3, b3, and c3 calculated by UPG (3) are a3: 3 steps, b3: 5 steps, and c3: 6 steps, respectively, and thus 6 steps are extracted.

When the UPG-max is downloaded to PLC 100B, the communication delay times of variables a3, b3, and c3 calculated by UPG (3) are a3: 4 steps, b3: 4 steps, and c3: 5 steps, respectively, and thus 5 steps are extracted.

When the UPG-max is downloaded to PLC 100C, the communication delay times of variables a3, b3, and c3 calculated by UPG (3) are a3: 5 steps, b3: 3 steps, and c3: 4 steps, respectively, and thus 5 steps are extracted.

When the UPG-max is downloaded to PLC 100D, the communication delay times of variables a3, b3, and c3 calculated by UPG (3) are a3: 6 steps, b3: 4 steps, and c3: 3 steps, respectively, and thus 6 steps are extracted.

Disposition tool 63 determines PLC 100 having the maximum value of the communication delay time that is minimum among maximum values of the communication delay times received from PLCs 100 (steps T7, T9). According to the above example, disposition tool 63 extracts PLC 100B and PLC 100C. When the plurality of PLCs 100 are extracted as described above, for example, disposition tool 63 determines PLC 100 having the larger available space of the memory as the download (disposition) destination of the UPG-max. For example, disposition tool 63 determines PLC 100B as the download destination of the UPG-max.

Disposition tool 63 downloads the UPG-max to determined PLC 100 (step T11). In this way, determining PLC 100 to which UPG 69 is downloaded or downloading UPG 69 of determined PLC 100 is referred to as a UPG disposition.

Disposition tool 63 determines whether there is what is called remaining UPG 69 for which the UPG disposition is not performed among UPGs 69 indicated by identifier 151 of information 150 (step T13). When determining that there is remaining UPG 69 (YES in step T13), disposition tool 63 returns to step T3 and performs the processing of step T3 and subsequent steps for remaining UPG 69. When determining that there is no remaining UPG 69 (NO in step T13), disposition tool 63 ends the processing.

According to the processing in FIG. 14, UPG 69 of HDD 505 can be downloaded to optimal PLC 100. That is, PLC 100 having the shortest communication delay time can be disposed in order from UPG 69 having the longer execution time. In the embodiment, PLC 100 of the download destination of UPG 69 is determined based on the communication delay time, but the determination method is not limited to the method based on the communication delay time.

I. Functional Configuration of Field Device 90 and PLC 100

Figure 17:
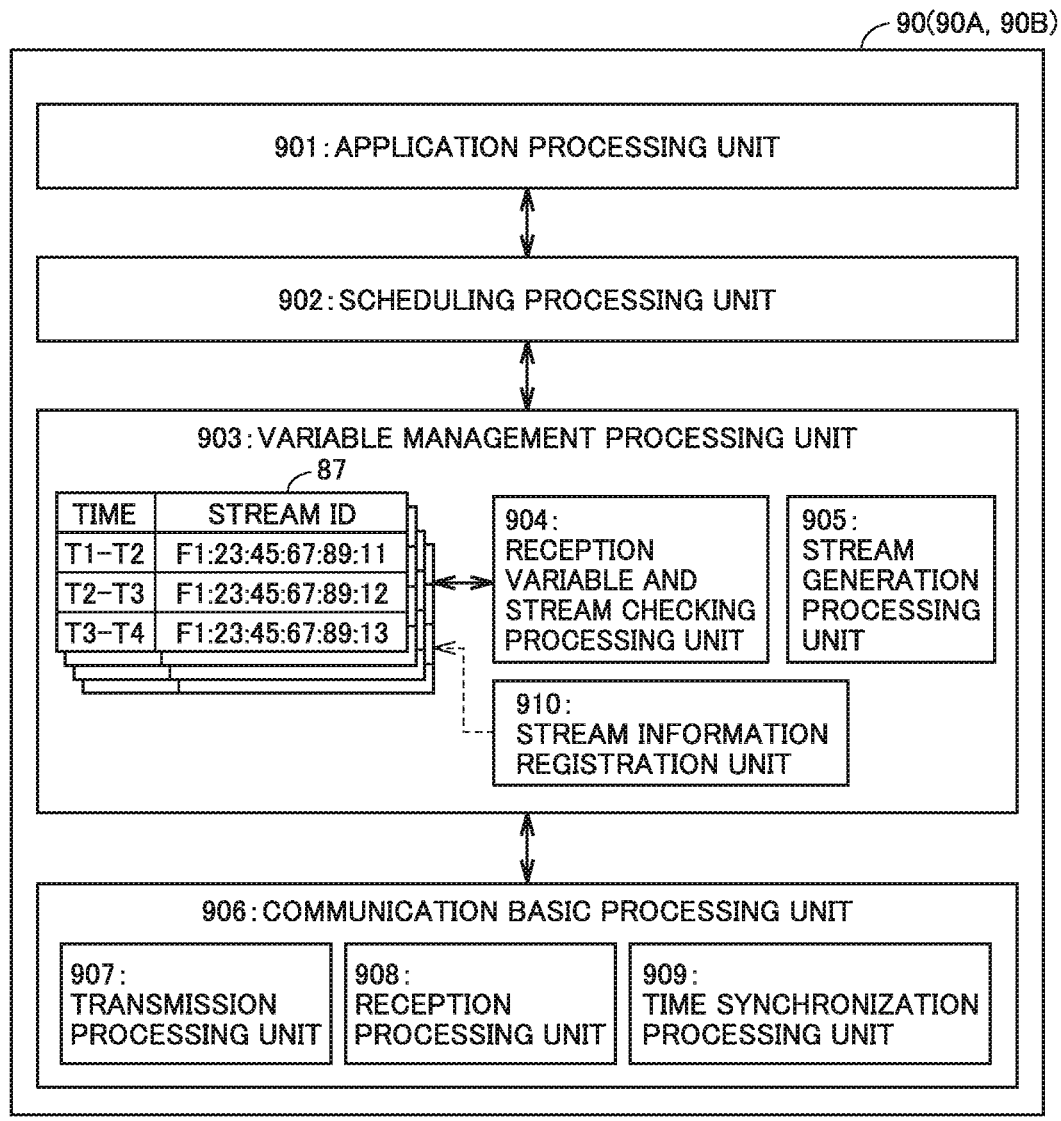
FIG. 17 is a view schematically illustrating a function included in the field device 90 of the embodiment.

FIG. 17 is a view schematically illustrating a function included in field device 90 of the embodiment. The function in FIG. 17 is similarly provided in robot controllers 90A, 90B.

Referring to FIG. 17, field device 90 includes an application processing unit 901 that executes application program 82, a scheduling processing unit 902 corresponding to scheduler 84, a variable management processing unit 903 that manages the variable of data (including the control instruction or the field value) accessed (read or written) by application program 82, and a communication basic processing unit 906 that executes communication program 83 according to a communication protocol for the communication between field device 90 and an external device. Variable management processing unit 903 corresponds to variable management module 85.

Variable management processing unit 903 executes a stream processing program 89. Variable management processing unit 903 includes a reception variable and stream checking processing unit 904 that detects and receives the stream (communication frame 20) of the control instruction (variable) addressed to itself based on stream information 87, a stream generation processing unit 905 that generates the stream (communication frame 20) of the measured (detected) field value, and a stream information registration unit 910. Stream information registration unit 910 registers (stores) stream information 87 in memory 92. Communication basic processing unit 906 corresponding to communication program 83 includes a transmission processing unit 907 and a reception processing unit 908 that transmit and receive the stream (communication frame 20) and a time synchronization processing unit 909 corresponding to time synchronization program 831.

Figure 18:
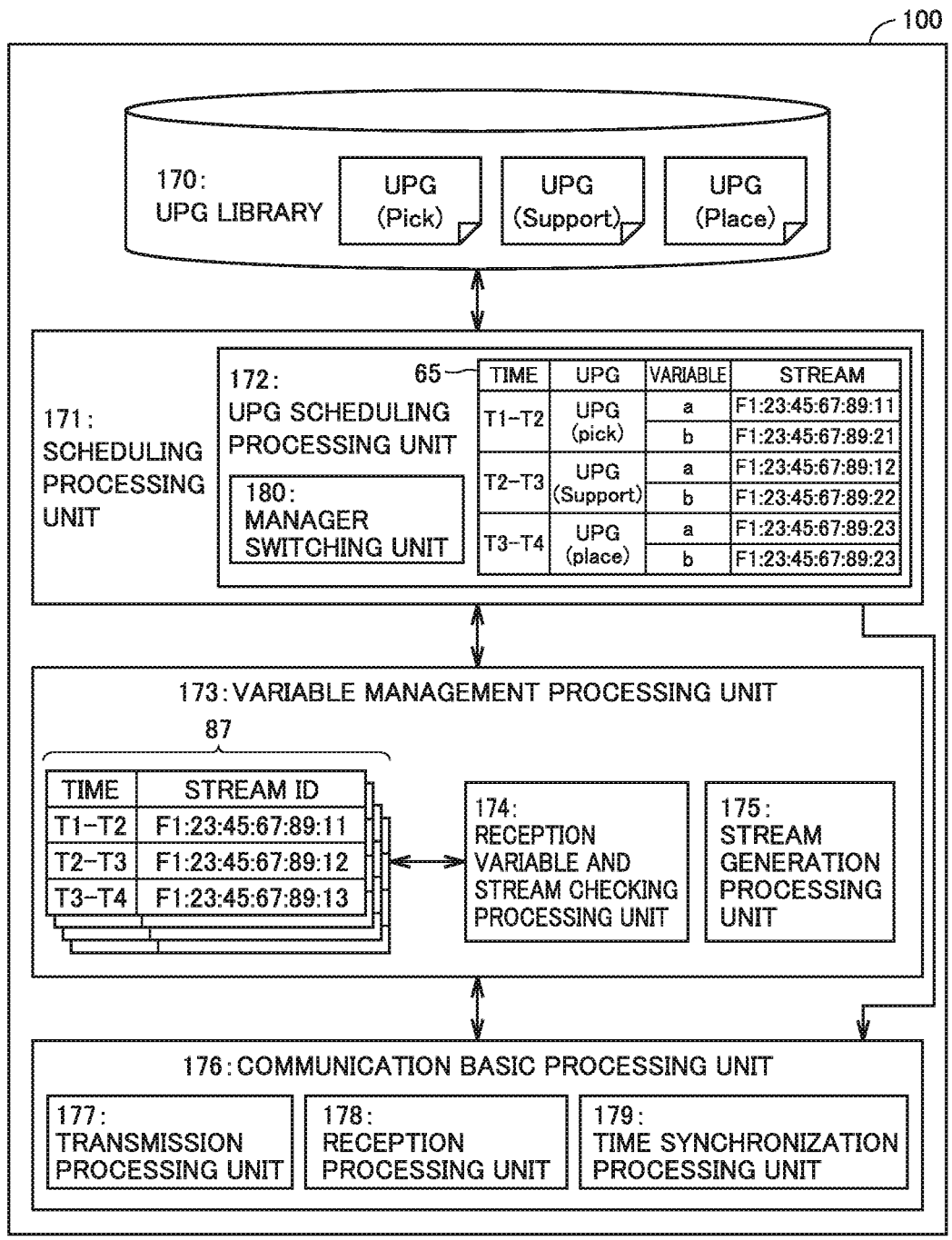
FIG. 18 is a view schematically illustrating a function included in the PLC 100 of the embodiment.

FIG. 18 is a view schematically illustrating a function included in PLC 100 of the embodiment. Referring to FIG. 18, PLC 100 includes UPG library 170 storing downloaded (placed) UPG 69, a scheduling processing unit 171 corresponding to scheduler 123, a variable management processing unit 173, and a communication basic processing unit 176 corresponding to communication program 127.

Scheduling processing unit 171 adjusts the execution timing so as to periodically execute various application programs including UPG 69. Scheduling processing unit 171 includes a UPG scheduling processing unit 172 that adjusts the execution timing so as to periodically execute UPG 69 of UPG library 170 according to UPG schedule 65. UPG scheduling processing unit 172 includes a manager switching unit 180 corresponding to manager switching program 128. Manager switching unit 180 performs the processing of switching the variable manager.

Variable management processing unit 173 executes a stream processing program 129. Variable management processing unit 173 includes a reception variable and stream checking processing unit 174 that detects and receives the stream (communication frame 20) addressed to itself based on stream information 87 and a stream generation processing unit 175 that generates the stream (communication frame 20) of the control instruction calculated by the execution of UPG 69. Communication basic processing unit 176 includes a transmission processing unit 177 and a reception processing unit 178 that transmit and receive the stream (communication frames 20) and a time synchronization processing unit 179 corresponding to time synchronization program 121.

J. Aspect in which UPG Manages Variable

In the embodiment, the mode of the variable manager by UPG 69 of system 1 includes modes of (static fixed), (static fluctuation), and (dynamic fluctuation). The user can designate one of the modes by operating support device 500. Each mode will be described.

(j1. Static Fixed Mode)

Figure 19:
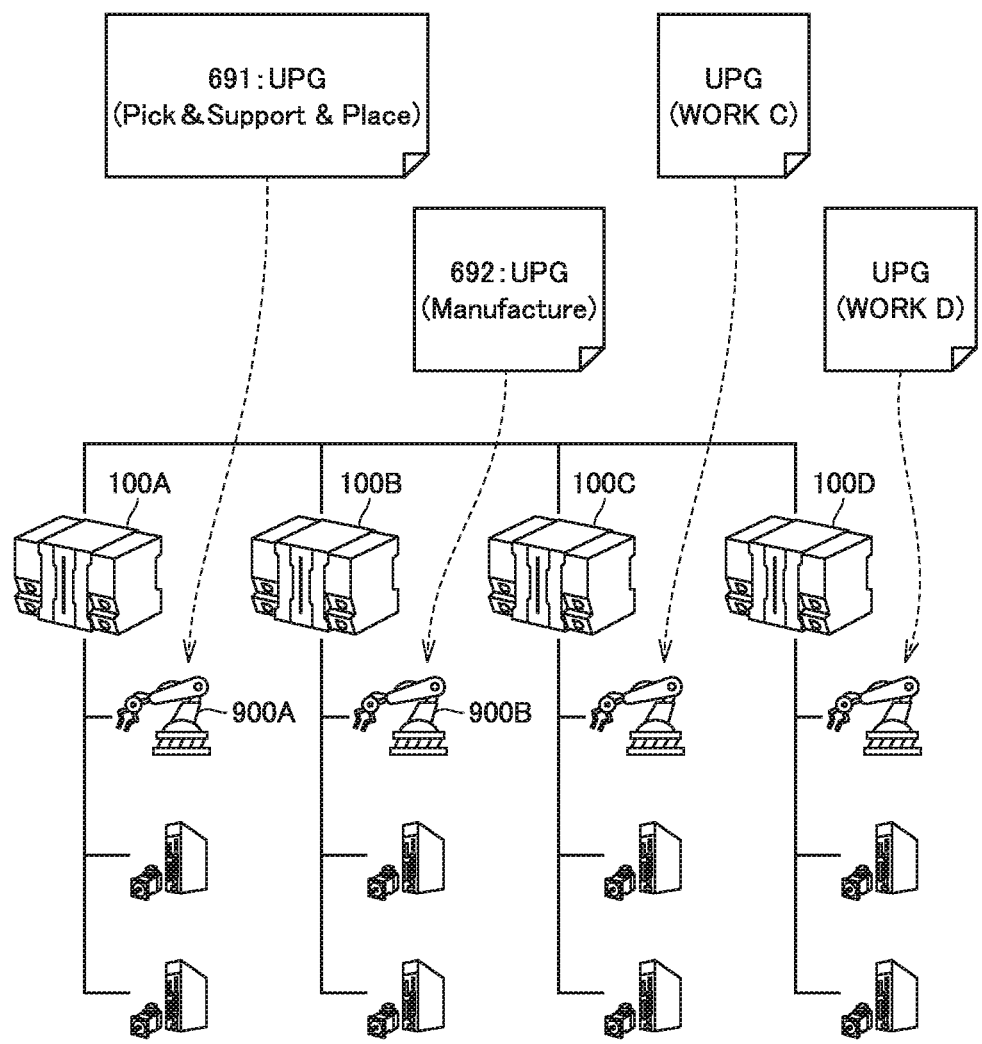
FIG. 19 is a view schematically illustrating a static fixing mode of the embodiment.
Figure 20:
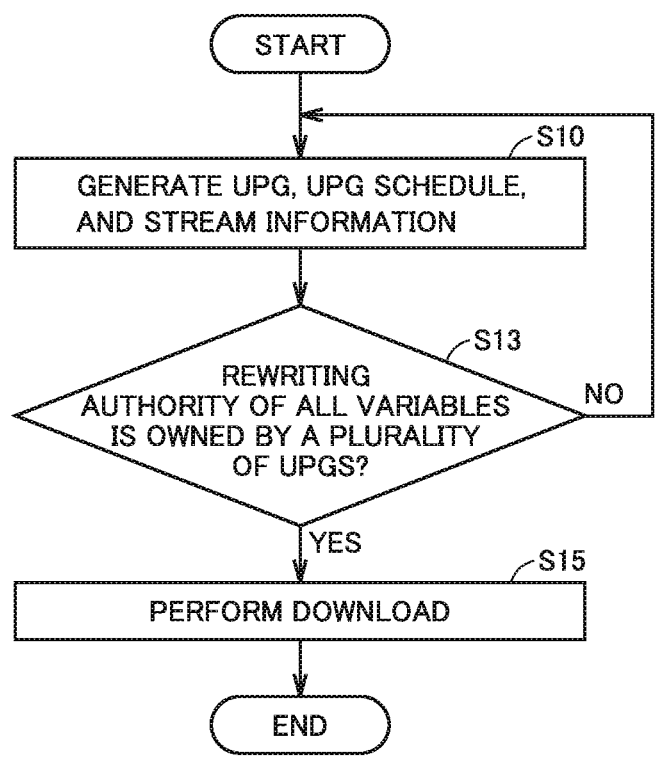
FIG. 20 is a flowchart illustrating an example of processing in the static fixed mode of the embodiment.

In the static fixed mode, UPG schedule 65 is statically configured such that one output one variable is rewritten by one UPG 69. FIG. 19 is a view schematically illustrating the static fixing mode of the embodiment. FIG. 20 is a flowchart illustrating an example of processing in the static fixed mode of the embodiment. In this case, a UPG 691 calculates the output variable at the arm position of robot 900A connected to PLC 100A in the order of "pick", "support", and "place" in synchronization with the control period according to UPG schedule 65, generates communication frame 20 of the calculated value of the output variable (control instruction), and transmits the communication frame 20 to robot controller 90A. In addition, a UPG 692 calculates the control instruction corresponding to the variable at the arm position of "manufacture" in robot 900B connected to PLC 100B in synchronization with the control period according to UPG schedule 65, and transmits the control instruction to robot controller 90B of robot 900B. In FIG. 19, UPG 69 that calculates the control instructions for work C and work D gives the calculated control instructions to the robot controllers of the robots connected to PLCs 100C and 100D.

In the embodiment, when UPG generation program 68 is activated to generate UPG 69 using UPG generation program 68, schedule generation program 66 performs processing according to the designated static fixed mode.

Referring to FIG. 20, UPG generation program 68 generates UPG 69 (for example, UPG (1) to UPG (4)) according to the user operation, schedule generation program 66 generates UPG schedule 65, and stream information generation program 67 generates stream information 87 (step S10). At this time, conflict detection program 611 is activated, and activated conflict detection program 611 determines whether there is the conflict of the variable manager based on UPG schedule 65 (step S13).

Specifically, conflict detection program 611 determines whether the variable managers of the same output variable to which the control instruction (command value) indicating the position of the arm of robot 900A is set conflict with each other (whether the plurality of UPGs 691 including UPG (1), UPG (2), and UPG (4) are executed in parallel or not) (step S13). Specifically, conflict detection program 611 determines whether the variable managers conflict with each other with respect to all the variables of variable 153 of UPG 691 of information 150. When it is determined that the variable managers conflict with each other with respect to any of the output variables (NO in step S13), the processing proceeds to step S10, and UPG program 69, UPG schedule 65, and stream information 87 are generated so as to avoid the conflict of the variable managers.

When determining that there is no conflict of the variable managers with respect to all the output variables (YES in step S13), conflict detection program 611 downloads UPG 69 and UPG schedule 65 to PLC 100, and disposes (downloads) stream information 87 to field device 90 including robot controllers 90A, 90B (step S15).

(j2. Static Fluctuation Mode)

In the static fluctuation mode, one variable is rewritten by the plurality of UPGs 69. The preparation of UPG program 69 according to the static fluctuation mode and the method for generating UPG schedule 65 and stream information 87 according to the user operation are similar to the processing in FIG. 9, and thus, the description thereof is not repeated.

(j3. Dynamic Fluctuation Mode)

In the static fixed mode and the static fluctuation mode, stream information 87 obtained in generating UPG schedule 65 is previously set (statically set) in each field device 90, and field device 90 receives communication frame 20 matched with the stream ID addressed to itself based on set stream information 87.

On the other hand, in the dynamic fluctuation mode, each field device 90 does not include statically-set stream information 87. Specifically, while operating in PLC 100 according to UPG schedule 65, field device 90 acquires dynamic stream information 870 based on manager switching notification 31 output by manager switching unit 180 according to the switching (that is, dynamic switching of the variable manager of the variable) of UPG 69 by UPG scheduling processing unit 172. Also in the dynamic fluctuation mode, the "arbitration module" is provided and configured by including a UPG scheduling processing unit 71 including manager switching unit 180.

Figure 21:
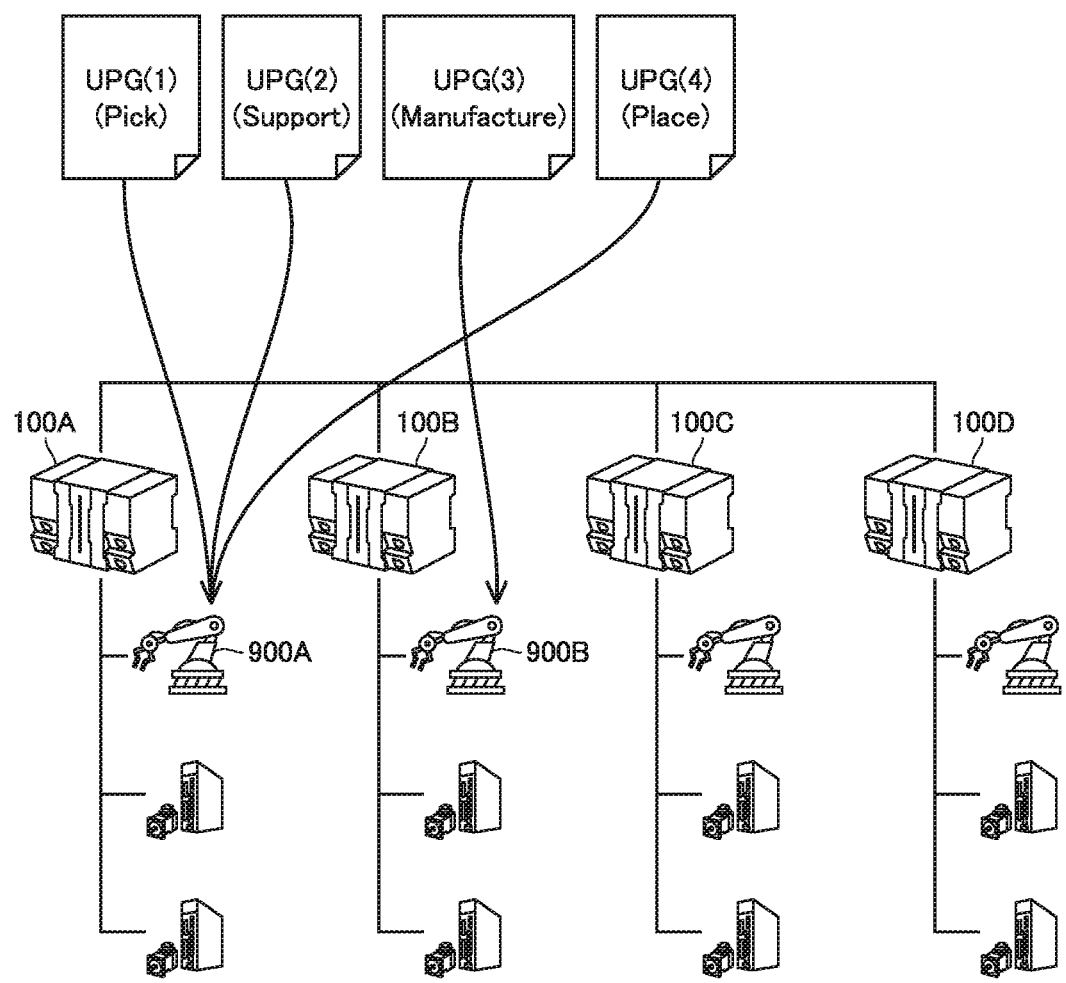
FIG. 21 is a view schematically illustrating a dynamic fluctuation mode of the embodiment.
Figure 22:
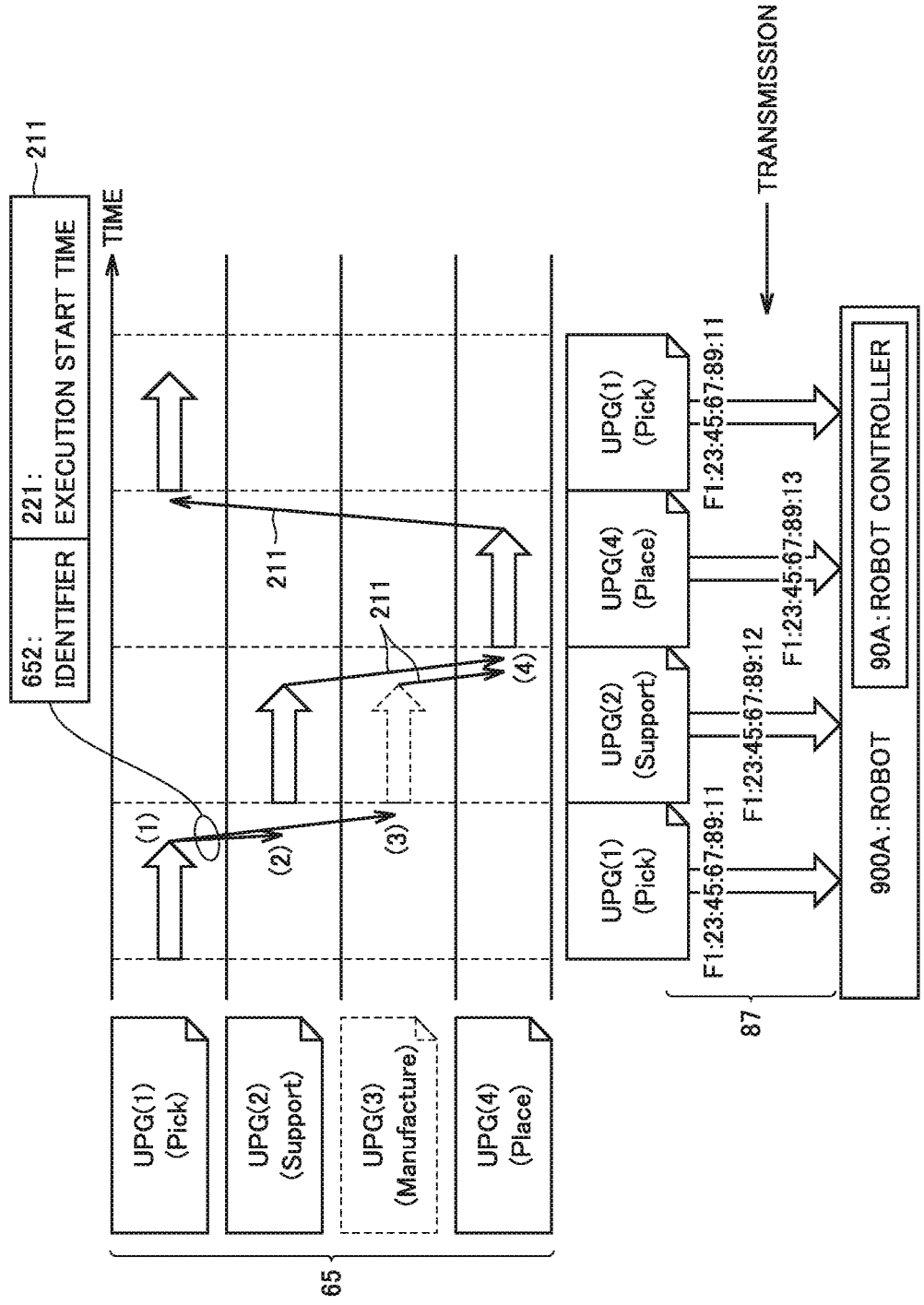
FIG. 22 is a timing chart illustrating the dynamic fluctuation mode of the embodiment.

In the dynamic fluctuation mode, a certain variable is rewritable by the plurality of UPGs 69. FIG. 21 is a view schematically illustrating the dynamic fluctuation mode of the embodiment. FIG. 22 is a timing chart illustrating the dynamic fluctuation mode of the embodiment. Referring to FIG. 21, UPG (1), UPG (2), and UPG (4) are generated as UPG 69 that outputs (rewrites) the control instruction corresponding to, for example, the variables of the arm positions of "pick", "support", and "place" to robot 900A connected to PLC 100A. UPG (3) is generated as UPG 69 that outputs (rewrites) the control instruction corresponding to the variable of the arm position of "manufacture" to robot 900B connected to PLC 100B. FIG. 22 schematically illustrates an example of UPG schedule 65 generated for system 1 of FIG. 21 and stream information 87 transmitted to field device 90 during the operation of UPG 69.

Referring to FIG. 22, the scheduling of the variable manager switching according to UPG schedule 65 in the dynamic fluctuation mode will be described. First, an execution instruction 211 for executing second-place UPG 69 is generated after the execution (operation) of UPG (1) is completed (step (1) in FIG. 22). Execution instruction 211 includes an identifier 652 of second-place UPG 69 and an execution start time 221 of second-place UPG 69. In the embodiment, the "second-place UPG" indicates a UPG to be executed next when the execution of a certain UPG is completed.

When second-place UPG 69 is in UPG library 170 in own PLC 100, PLC 100 executes second-place UPG 69 according to execution instruction 211 when timer 160 times execution start time 221 (step (2) in FIG. 22).

When second-place UPG 69 is not in UPG library 170 in own PLC 100, namely, when second-place UPG 69 is in another PLC 100, PLC 100 notifies another PLC 100 of execution instruction 211 by, for example, the multicast address. When execution start time 221 is timed according to received execution instruction 211, another PLC 100 executes second-place UPG 69 in UPG library 170 of own PLC 100 (step (3) in FIG. 22).

In the embodiment, second-place UPG 69 to be executed after the execution completion of the plurality of related UPGs 69 is executed when the execution of the plurality of related UPGs 69 is completed. Specifically, after receiving execution instruction 211 corresponding to all related UPGs 69, PLC 100 executes second-place UPG 69 according to received execution instruction 211 (step (4) in FIG. 22). In this case, the time at which the execution of second-place UPG 69 is started corresponds to the latest time among execution start times 221 designated by received execution instructions 211.

When UPG 69 to be executed is switched to second-place UPG 69, PLC 100 transmits notification 31 of manager switching onto network 11 by multicast. Further, when transmitting notification 31, PLC 100 transmits, to field device 90, stream information 87 identifying communication frame 20 having the control instruction output from one UPG 69 (second-place UPG 69) after the switching and information about the time at which the reception of the stream (communication frame 20) having stream ID 29 starts. When receiving notification 31, field device 90 (includes robot controllers 90A, 90B) receives stream information 87 received from PLC 100, and can selectively receive communication frame 20 having the control instruction addressed to itself based on the stream information from communication frame 20 transmitted onto network 11 after the switching.

Figure 23:
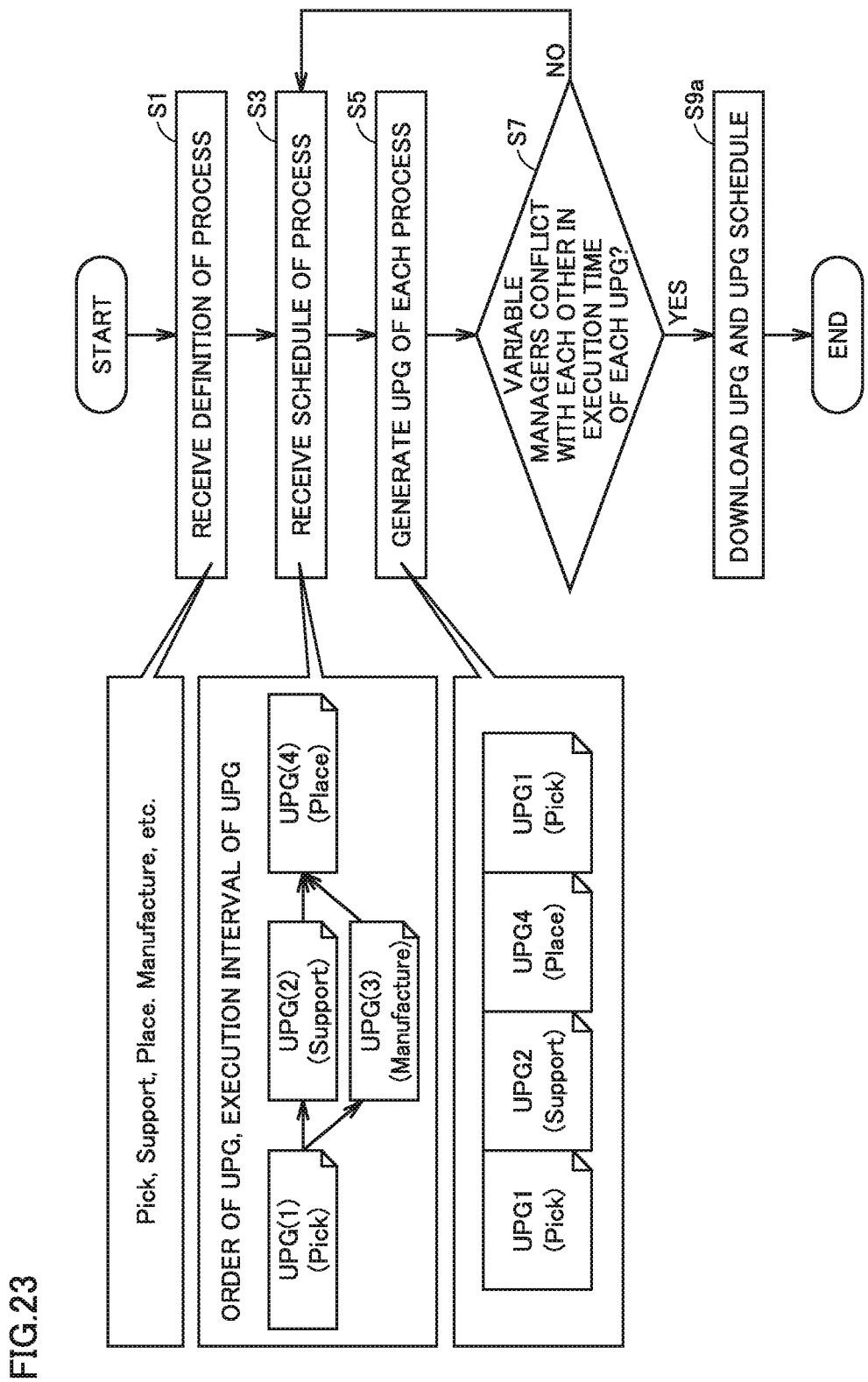
FIG. 23 is a flowchart schematically illustrating processing of a support tool for the dynamic fluctuation mode of the embodiment.

FIG. 23 is a flowchart schematically illustrating processing of the support tool for the dynamic fluctuation mode of the embodiment. In the processing of FIG. 23, step S9 in FIG. 9 is changed to step S9a. Other pieces of processing in FIG. 23 are similar to those in FIG. 9, and thus the description thereof will not be repeated.

In step S9a, UPG 69 generated in steps S1 to S7 and statically-set UPG schedule 65 are downloaded to PLC 100 (step S9a).

(j3-1. Processing Before Execution)

Figure 24:
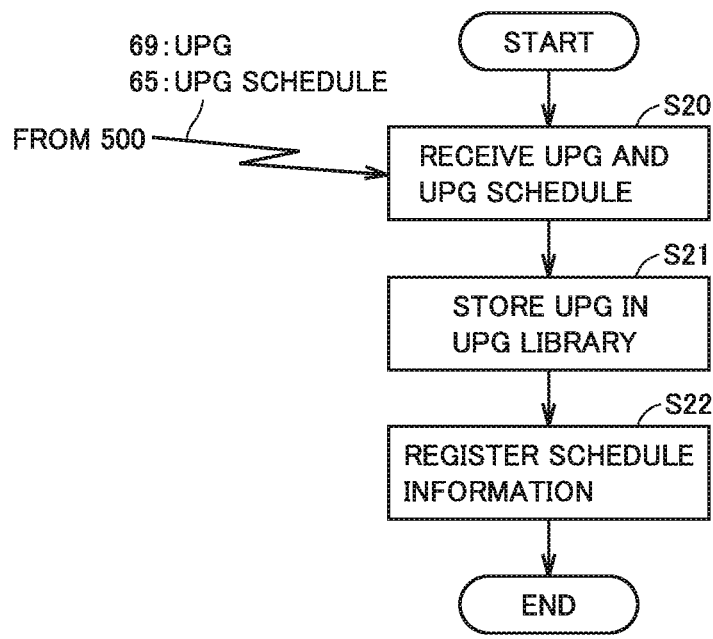
FIG. 24 is a flowchart illustrating an example of processing before execution of a UPG in the dynamic fluctuation mode of the embodiment.

FIG. 24 is a flowchart illustrating an example of the processing before the execution of the UPG in the dynamic fluctuation mode of the embodiment. Referring to FIG. 24, before UPG 69 is executed in system 1, for example, at the time of the activation of system 1, each PLC 100 receives UPG 69 and UPG schedule 65 determined by disposition tool 63 (step S20), stores received UPG 69 in UPG library 170, and stores UPG schedule 65 in storage 119 (steps S21 and S22).

(j3-2. Processing at Start of Execution of UPG 69)

Figure 25:
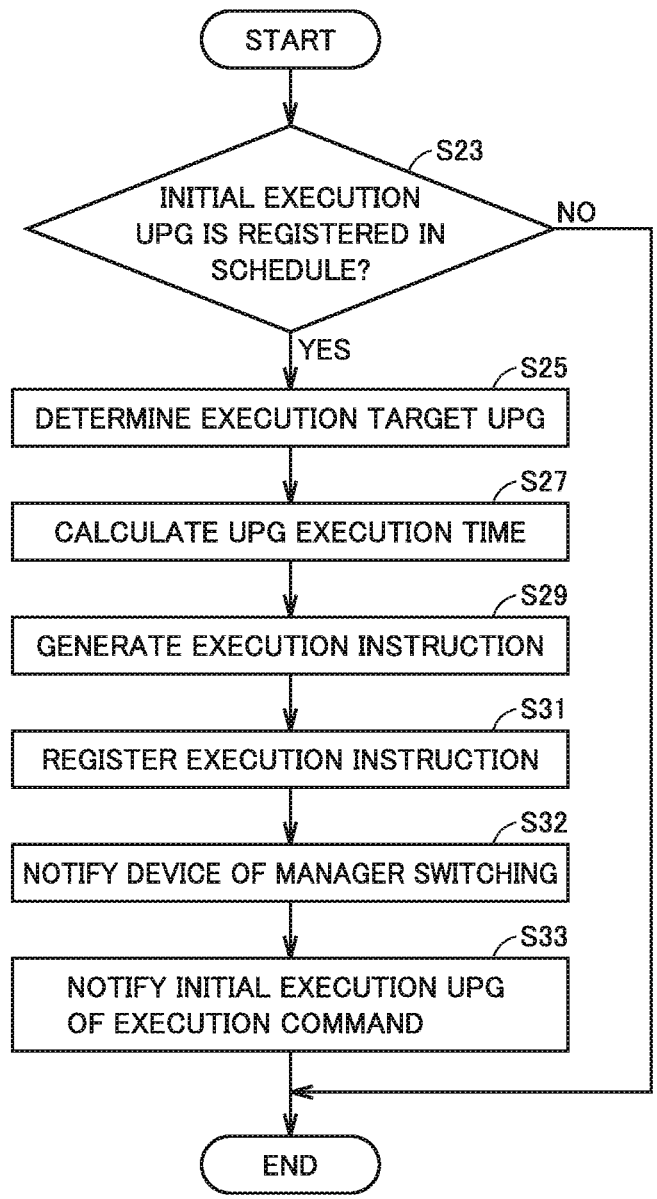
FIG. 25 is a flowchart illustrating an example of processing at a start of the execution of the UPG in the dynamic fluctuation mode of the embodiment.

FIG. 25 is a flowchart illustrating an example of the processing at the start of the execution of the UPG in the dynamic fluctuation mode of the embodiment. Referring to FIG. 25, when PLC 100 is activated in the dynamic fluctuation mode, PLC 100 determines whether initial execution UPG 69 is registered in UPG schedule 65 (step S23). Specifically, arithmetic processing unit 110 searches UPG 69 to be executed first from UPG schedule 65 based on the initial execution UPG flag. When determining that UPG 69 to be executed first by the search is not registered in UPG schedule 65 (NO in step S23), the arithmetic processing unit 110 ends the processing in FIG. 25.

On the other hand, when determining that initial execution UPG 69 is registered in UPG schedule 65 (YES in step S23), the arithmetic processing unit 110 determines initial execution UPG 69 as UPG 69 of the execution target (step S25), and UPG scheduling processing unit 172 calculates execution start time 221 of UPG 69 (step S27). For example, execution start time 221 is calculated based on (execution start time=current time output by timer 160+execution interval of UPG 69). At this point, the execution interval of UPG 69 is an interval corresponding to a predetermined period synchronized with the control period.

UPG scheduling processing unit 172 generates execution instruction 211 for starting the execution of initial execution UPG 69 at execution start time 221 calculated in step S27 (step S29), and registers generated execution instruction 211 in scheduling processing unit 171 (step S31).

Manager switching unit 180 generates communication frame 20 having manager switching notification 31 indicating that UPG 69 to be executed is switched, and transmits communication frame 20 onto network 11 by multicast through communication basic processing unit 176 (step S32). Thus, when executing initial execution UPG 69, PLC 100 can notify all the devices of system 1 that the variable manager is switched. In addition, PLC 100 notifies field device 90 that is the control target that the processing of the communication frame 20 of the specific stream information is started from the time of execution start time 221 included in the execution instruction 211.

When detecting that timer 160 has timed execution start time 221 of registered execution instruction 211, scheduling processing unit 171 notifies initial execution UPG 69 of UPG library 170 of the execution command in order to cause initial execution UPG 69 to execute (step S33).

(j3-3. Case where PLC 100 Receives Execution Instruction from Inside)

Figure 26:
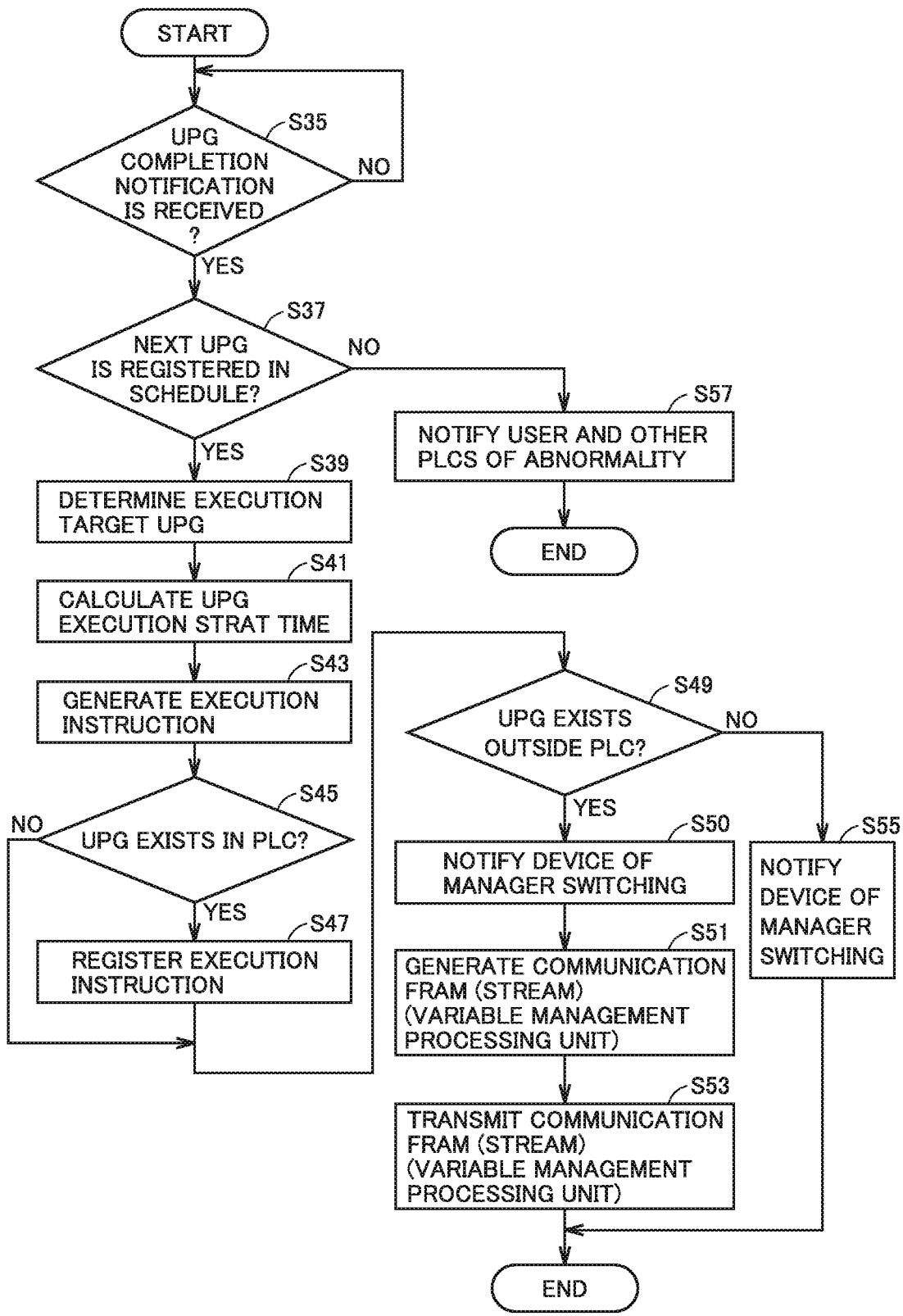
FIG. 26 is a flowchart illustrating an example of processing during the execution of the UPG of the embodiment.

FIG. 26 is a flowchart illustrating an example of the processing during the execution of the UPG of the embodiment. Referring to FIG. 26, the case where PLC 100 executes UPG 69 of UPG library 170 of own PLC 100, and execution instruction 211 is output as the execution is completed will be described.

When PLC 100 executes UPG 69, UPG scheduling processing unit 172 determines whether the notification of the execution completion of UPG 69 is received from scheduling processing unit 171 (step S35). While scheduling processing unit 171 determines not to receive the notification of the execution completion of currently-executed UPG 69 (NO in step S35), step S35 is repeated. On the other hand, when scheduling processing unit 171 determines that the notification of the execution completion is received (YES in step S35), UPG scheduling processing unit 172 searches UPG schedule 65 and determines whether second-place UPG 69 is registered in UPG schedule 65 based on the search result (step S37).

When determining that second-place UPG 69 is not registered in UPG schedule 65 (NO in step S37), UPG scheduling processing unit 172 notifies the user or another PLC 100 of abnormality (step S57). Then, the processing in FIG. 26 is ended. On the other hand, when determining that second-place UPG 69 is registered in UPG schedule 65 (YES in step S37), UPG scheduling processing unit 172 determines that second-place UPG 69 is UPG 69 of the execution target (step S39). Then, scheduling processing unit 171 calculates execution start time 221 similarly to steps S27 and S29, and generates execution instruction 211 including calculated execution start time 221 (steps S41, S43).

UPG scheduling processing unit 172 determines whether UPG 69 (second-place UPG 69) determined as the execution target is in UPG library 170 (step S45). Specifically, UPG scheduling processing unit 172 searches UPG library 170 based on identifier 652 of UPG 69, and performs the determination based on the search result (step S45). In this case, UPG (2) is searched from UPG library 170 as second-place UPG 69.

UPG scheduling processing unit 172 determines that second-place UPG (2) next to UPG (1) is in UPG library 170 in own PLC 100 according to UPG schedule 65 in FIG. 12 (YES in step S45), and proceeds to step S47. On the other hand, when determining that second-place UPG (2) is not in UPG library 170 in own PLC 100 (NO in step S45), UPG scheduling processing unit 172 proceeds to step S49.

UPG scheduling processing unit 172 registers execution instruction 211 of second-place UPG (2) in scheduling processing unit 171 (step S47), and proceeds to step S49. Thus, similarly to steps S31 and S32, scheduling processing unit 171 notifies second-place UPG (2) in UPG library 170 of the execution instruction at execution start time 221 indicated by execution instruction 211 based on registered execution instruction 211.

In step S49, UPG scheduling processing unit 172 determines whether second-place UPG (2) is in another PLC 100 based on the determination result in step S45 (step S49). When determining that second-place UPG (2) is not in another PLC 100 (that is, second-place UPG (2) is in UPG library 170 of own PLC 100) (NO in step S45, NO in step S49), UPG scheduling processing unit 172 proceeds to step S55. In step S55, similarly to step S33, manager switching unit 180 generates communication frame 20 including manager switching notification 31, and transmits communication frame 20 over network 11 by multicast through communication basic processing unit 176.

When determining that second-place UPG (2) is in UPG library 170 in own PLC 100 (YES in step S45, NO in step S49), UPG scheduling processing unit 172 first determines that UPG (2) is in another PLC 100 (YES in step S49). When manager switching notification 31 is transmitted (step S50), variable management processing unit 173 generates communication frame 20 storing stream information 87 (step S51), and transmits generated communication frame 20 onto network 11 (step S53).

(j3-4. Case where PLC 100 Receives Execution Instruction from Another PLC 100)

Figure 27:
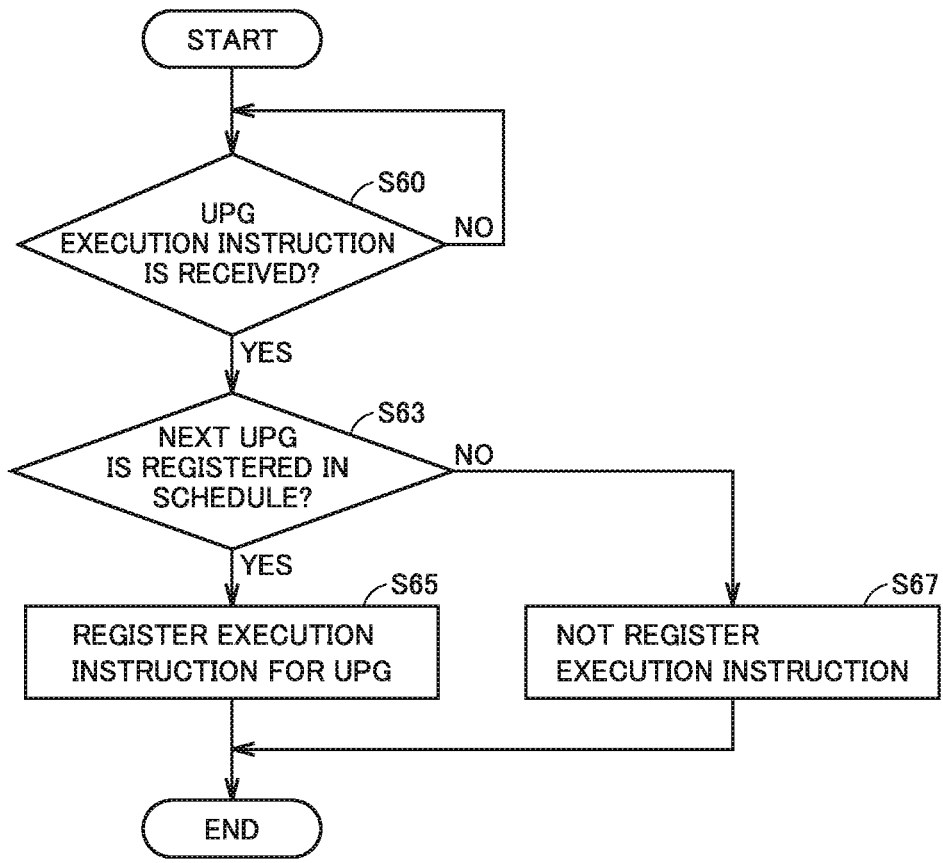
FIG. 27 is a flowchart illustrating an example of the processing during the execution of the UPG of the embodiment.

FIG. 27 is a flowchart illustrating an example of the processing during the execution of the UPG of the embodiment. Referring to FIG. 27, the case where PLC 100 receives execution instruction 211 for second-place UPG 69 from another PLC 100 will be described.

Communication basic processing unit 176 determines whether execution instruction 211 is received from external PLC 100 through network 11 (step S60). When determining that execution instruction 211 is not received through network 11 (NO in step S60), communication basic processing unit 176 repeats step S60.

When communication basic processing unit 176 determines that execution instruction 211 is received through network 11 (YES in step S60), UPG scheduling processing unit 172 searches UPG library 170 based on identifier 652 of received execution instruction 211, and determines whether second-place UPG 69 is registered in UPG library 170 based on the search result (step S63).

When determining that second-place UPG 69 is not registered in UPG library 170 (NO in step S63), UPG scheduling processing unit 172 does not register (output) execution instruction 211 in scheduling processing unit 171 (step S67). When determining that second-place UPG 69 is registered in UPG library 170 (YES in step S63), UPG scheduling processing unit 172 registers execution instruction 211 in scheduling processing unit 171 (step S65).

According to the processing in FIG. 27, when the plurality of PLCs 100 receive execution instruction 211 transmitted by multicast, second-place UPG 69 can be executed according to execution instruction 211 only in PLC 100 in which second-place UPG 69 indicated by execution instruction 211 is in own UPG library 170.

(j4. Interlocking Between Execution Instruction and Switching of Variable Manager)

Figure 28:
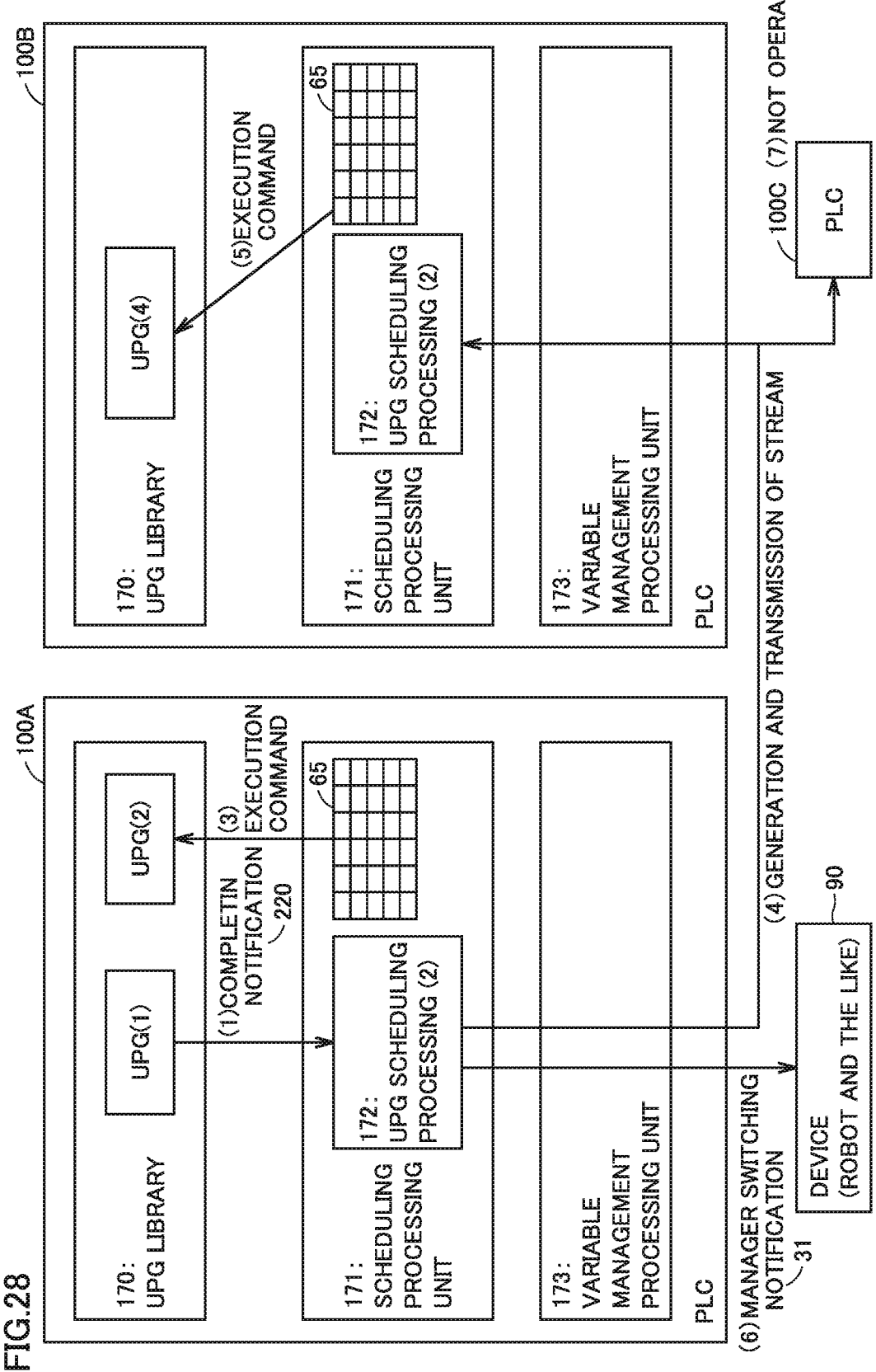
FIG. 28 is a view schematically illustrating an example of processing of switching a variable manager in the dynamic fluctuation mode of the embodiment.

FIG. 28 is a view schematically illustrating an example of the processing of switching the variable manager in the dynamic fluctuation mode of the embodiment. In FIG. 28, PLCs 100A, 100B and 100C can execute UPG 69, UPG library 170 of PLC 100A includes UPG (1) and UPG (2), UPG library 170 of PLC 100B includes UPG (4), and UPG library 170 of PLC 100C does not include UPG (4). As illustrated in FIG. 12, in UPG schedule 65, the execution order of UPG (1)→UPG (2)→UPG (4) is designated by time 651.

In the dynamic fluctuation mode, UPG (1) in PLC 100A outputs a completion notification 220 when the execution is completed, and UPG scheduling processing unit 172 sets flag 655 of UPG (1) of UPG schedule 65 to "0" when receiving completion notification 220 (step (1)).

Scheduling processing unit 171 specifies second-place UPG (2) according to UPG schedule 65 and generates execution instruction 211 of specified second-place UPG (2). When second-place UPG (2) is in UPG library 170 of PLC 100A, UPG scheduling processing unit 172 registers execution instruction 211 in scheduling processing unit 171 (step (2)).

When execution start time 221 indicated by registered execution instruction 211 arrives, scheduling processing unit 171 outputs the execution instruction to second-place UPG (2) of UPG library 170 (step (3)).

On the other hand, when second-place UPG (2) is not in UPG library 170, UPG scheduling processing unit 172 transmits execution instruction 211 over network 11 by multicast (step (4)).

PLC 100B and PLC 100C receive execution instruction 211 on network 11. In PLC 100B and PLC 100C, PLC 100B determines that UPG (2) (second-place UPG 69) corresponding to identifier 652 included in received execution instruction 211 is in own UPG library 170. Similarly to PLC 100A, when execution start time 221 indicated by received execution instruction 211 arrives, PLC 100B sets corresponding flag 655 to "1" and outputs the execution instruction to second-place UPG (2) of UPG library 170 (step (5)). On the other hand, PLC 100C receives execution instruction 211 through network 11, but does not include second-place UPG (2) corresponding to identifier 652 included in execution instruction 211, and thus, PLC 100C does not perform the operation according to execution instruction 211 even when receiving multicasted execution instruction 211 (step (7)).

After performing step (3) or step (4), manager switching unit 180 of PLC 100A generates communication frame 20 of manager switching notification 31 and transmits communication frame 20 onto network 11 by multicast (step (6)).

According to the processing in FIG. 28, when UPG scheduling processing unit 172 outputs execution instruction 211 for second-place UPG (2) according to UPG schedule 65, manager switching unit 180 transmits manager switching notification 31 over network 11 by multicast. As a result, other devices (PLC 100 and field device 90) can detect that UPG 69 executed by the other PLC 100 (PLC 100A in FIG. 28) is switched to second-place UPG 69 (UPG (2) in FIG. 28) by receiving manager switching notification 31.

K. Manager Switching Notification 31 and Device Operation

FIG. 29 is a view illustrating a relationship between manager switching notification 31 and the device operation of the embodiment. The table in FIG. 29 illustrates a set including the content of notification 31, information previously possessed by the device (field device 90), and the operation (behavior) corresponding to each of a first case, a second case, and a third case. Referring to FIG. 29, each of notifications 31 of the first case, the second case, and the third case includes a stream ID 292 used for an execution start time 291 of second-place UPG 69 and the communication of the data (control instruction) of the output variable.

Figure 30:
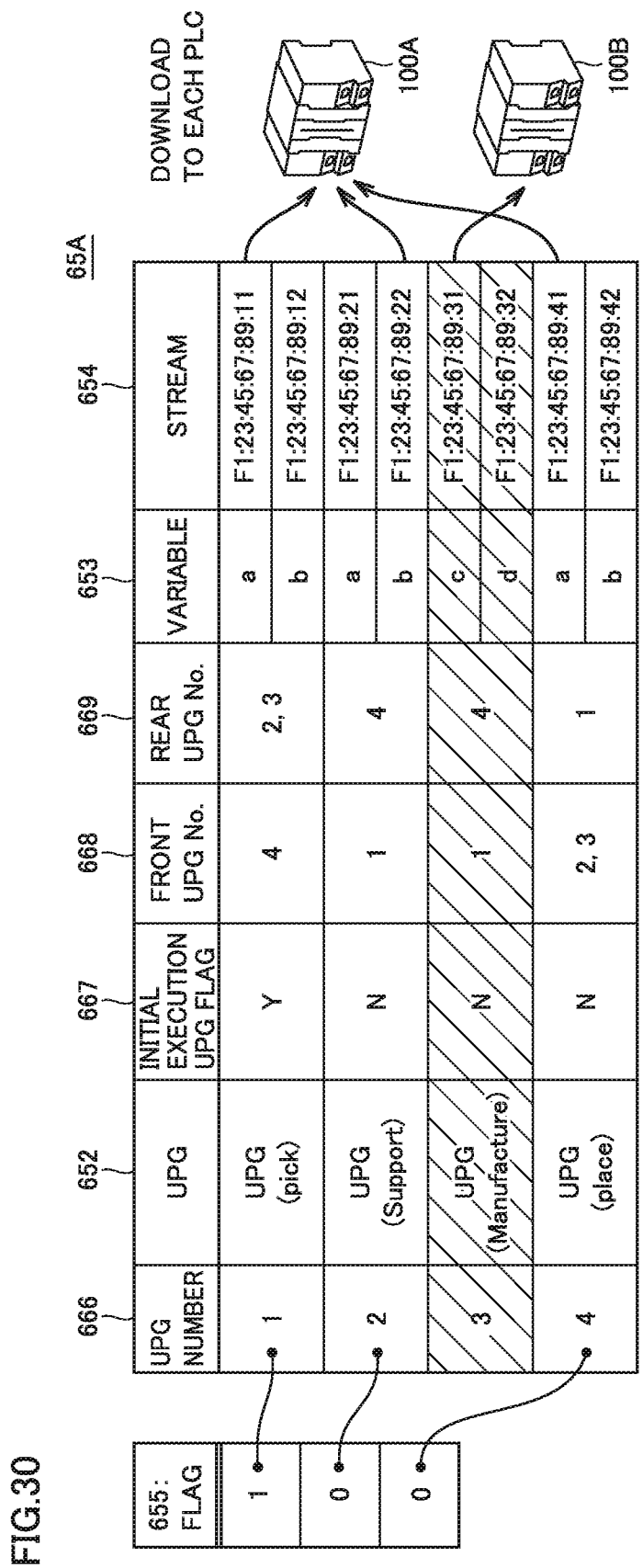
FIG. 30 is a view schematically illustrating another example of the UPG schedule of the embodiment.

FIG. 30 is a view schematically illustrating another example of the UPG schedule of the embodiment. Schedule generation program 66 of support device 500 generates UPG schedule 65A in FIG. 30 corresponding to the dynamic fluctuation mode according to the user operation. Generated UPG schedule 65A is downloaded to each PLC 100.

Referring to FIG. 30, UPG schedule 65A stores information for each UPG 69. The information about UPG 69 includes a UPG number 666 corresponding to the execution order of the UPG, an identifier 652 of UPG 69, an initial execution flag 667 specifying UPG 69 to be executed first according to UPG schedule 65A, a front UPG number 668, a rear UPG number 669, an output variable 653, and a stream ID 654. Front UPG number 668 and rear UPG number 669 indicate UPG number 666 of UPG 69 executed before and after the execution of corresponding UPG 69, respectively. Hereinafter, the first case, the second case, and the third case in FIG. 29 in the dynamic fluctuation mode will be described.

(k1. First Case)

Figure 31:
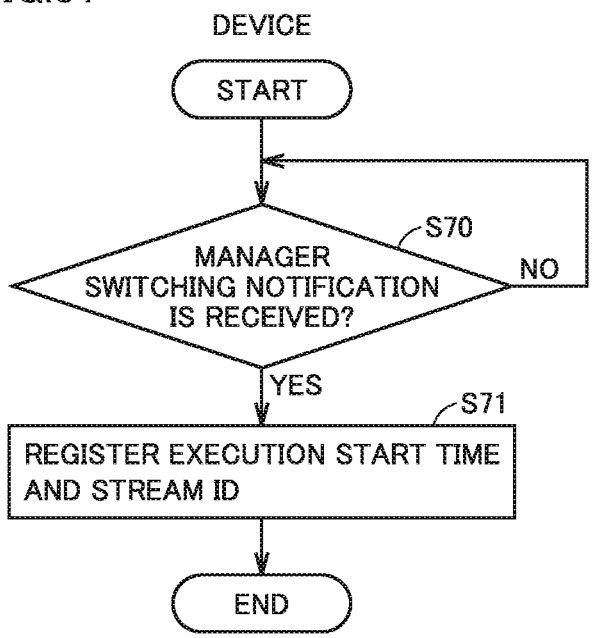
FIG. 31 is a flowchart illustrating an outline of processing of the field device 90 according to "first case" of the dynamic fluctuation mode of the embodiment.
Figure 32:
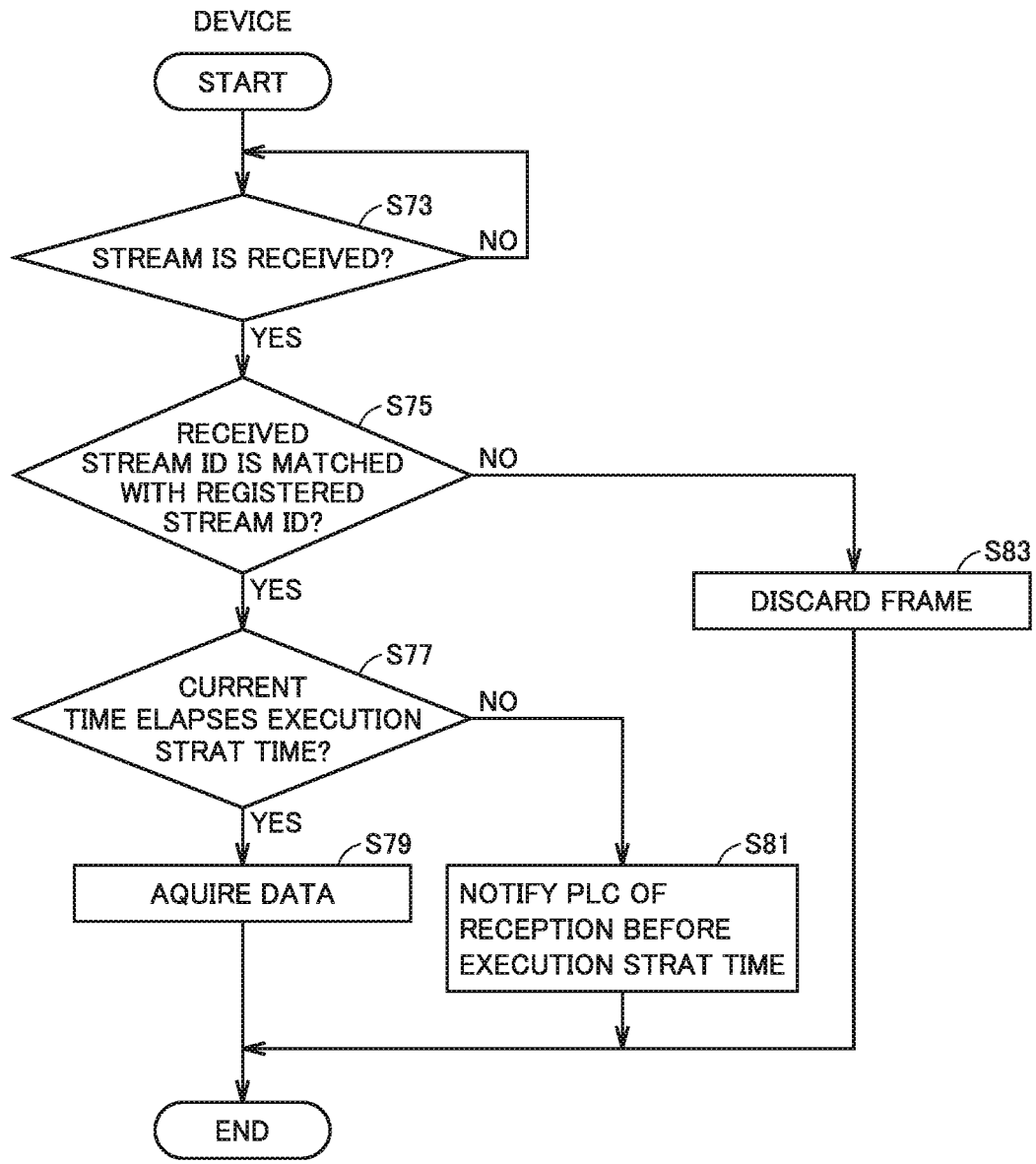
FIG. 32 is a flowchart illustrating the outline of the processing of the field device 90 according to "first case" of the dynamic fluctuation mode of the embodiment.

FIGS. 31 and 32 are flowcharts illustrating an outline of processing of field device 90 according to "first case" of the dynamic fluctuation mode of the present embodiment. FIG. 31 illustrates the outline of the processing according to "first case" of the present embodiment. Referring to FIG. 31, stream information registration unit 910 of field device 90 determines whether to receive manager switching notification 31 through communication basic processing unit 906 (step S70).

When determining that notification 31 is not received (NO in step S70), stream information registration unit 910 repeats the determination in step S70, but when determining that the notification 31 is received (YES in step S70), stream information registration unit 910 proceeds to step S71.

Stream information registration unit 910 stores execution start time 291 and stream ID 292 of received notification 31 in memory 92 as dynamic stream information 870 (step S71).

As described above, even when stream information 87 is not statically set in field device 90, field device 90 can acquire dynamic stream information 870 by receiving manager switching notification 31 during the execution of UPG 69.

Referring to FIG. 32, an example of the processing based on dynamic stream information 870 acquired by the processing in FIG. 31 will be described. First, communication basic processing unit 906 of field device 90 determines whether communication frame 20 storing stream ID 29 is received (step S73), and repeats the processing in step S73 while communication basic processing unit 906 determines that communication frame 20 is not received (NO in step S73).

On the other hand, when communication basic processing unit 906 determines that communication frame 20 storing stream ID 29 is received (YES in step S73), reception variable and stream checking processing unit 904 collates stream ID 29 of received communication frame 20 with stream ID 292 of dynamic stream information 870, and determines whether stream ID 29 and stream ID 292 are matched with each other (step S75).

When determining that stream ID 29 of received communication frame 20 is not matched with stream ID 292 of dynamic stream information 870 (NO in step S75), reception variable and stream checking processing unit 904 discards communication frame 20 (step S83), and ends the processing.

On the other hand, when determining that stream ID 29 of received communication frame 20 is matched with stream ID 292 of dynamic stream information 870 (YES in step S75), reception variable and stream checking processing unit 904 processes communication frame 20.

Specifically, reception variable and stream checking processing unit 904 determines whether the current time timed by timer 99 indicates the time after execution start time 291 of dynamic stream information 870 (that is, whether the current time indicates the time past execution start time 291) (step S77).

When determining that the current time does not indicate the time past execution start time 291 (NO in step S77), reception variable and stream checking processing unit 904 notifies PLC 100 of the reception before the execution start time using communication frame 20 (step S81).

On the other hand, when determining that the current time indicates the time past execution start time 291 (YES in step S77), reception variable and stream checking processing unit 904 acquires the control instruction of payload 26 of communication frame 20 and sets the control instruction in input data 944 (step S79). Thus, processor 91 operates the servomotor and the like according to the control instruction of input data 944.

(k2. Second Case)

Figure 33:
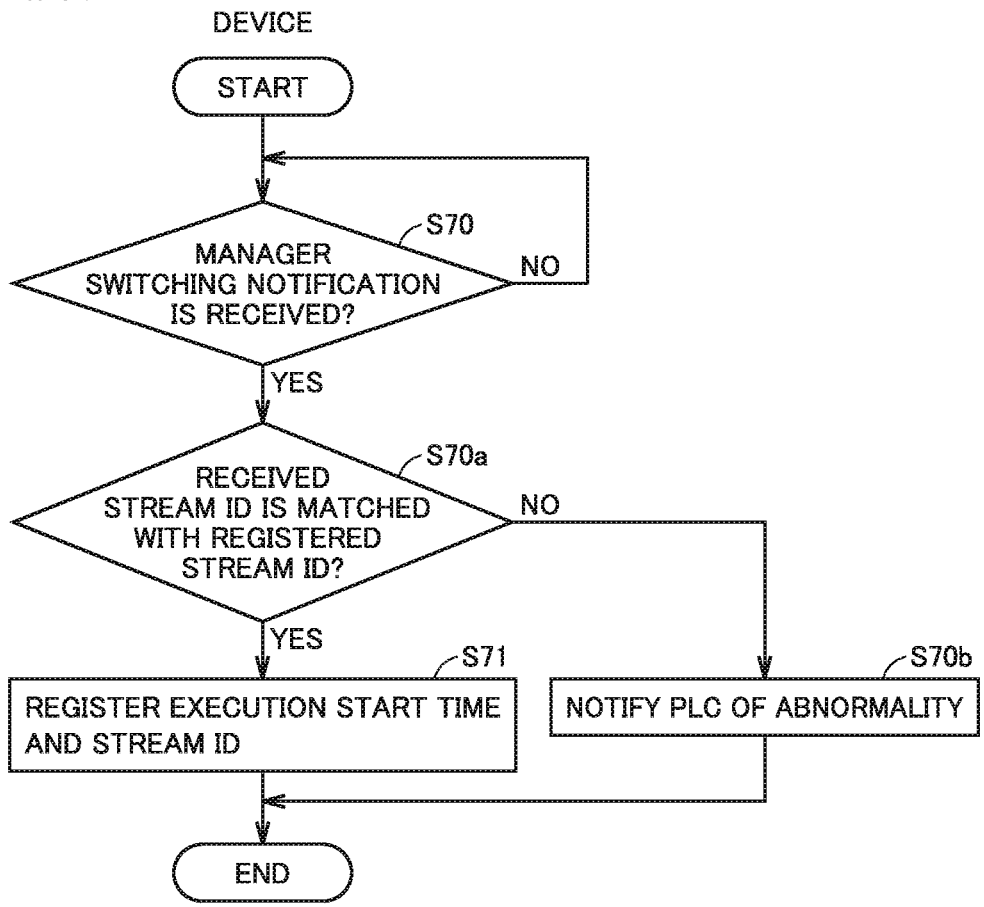
FIG. 33 is a flowchart illustrating an outline of processing of the field device 90 according to "second case" of the embodiment.
Figure 34:
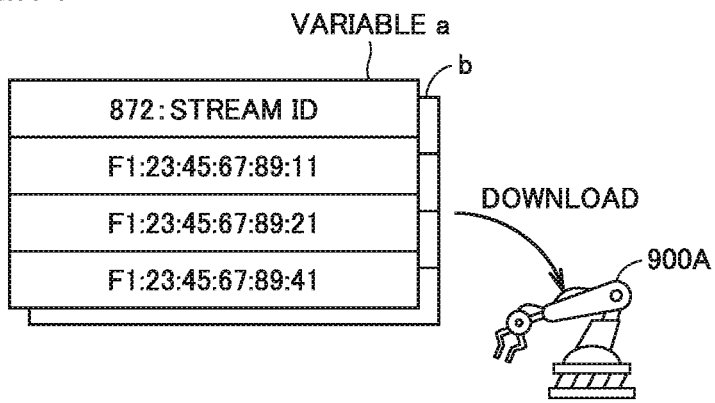
FIG. 34 is a view illustrating an example of stream information according to "second case" of the embodiment.

FIG. 33 is a flowchart illustrating an outline of processing of field device 90 according to "second case" of the embodiment. FIG. 34 is a view illustrating an example of the stream information according to "second case" of the embodiment. In the first case described above, stream information 87 is not statically set in field device 90 (that is, stream information 87 is not downloaded prior to the execution of UPG 69). However, in the second case, as illustrated in FIG. 34, only stream ID 872 in stream information 87 is statically set in field device 90.

Referring to FIG. 33, stream information registration unit 910 of the device determines whether to receive manager switching notification 31 through communication basic processing unit 906 (step S70). When stream information registration unit 910 determines that notification 31 is not received (NO in step S70), the determination in step S70 is repeated. When determining that notification 31 is received (YES in step S70), stream information registration unit 910 proceeds to step S70a.

Stream information registration unit 910 determines whether stream ID 292 indicated by received notification 31 is matched with stream ID 872 in FIG. 34 that is statically (previously) set (step S70a). When determining the inconsistency (NO in step S70a), stream information registration unit 910 transmits an abnormality notification to PLC 100 that is the transmission source of notification 31 (step S70b).

On the other hand, when determining that stream ID 292 indicated by received notification 31 is matched with stream ID 872 in FIG. 34 (YES in step S70a), stream information registration unit 910 stores execution start time 291 of notification 31 in memory 92 in association with matched stream ID 872 of FIG. 34 in step S71 (step S71). Thus, dynamic stream information 870 (execution start time 291 and stream ID 872) is stored in memory 92.

As in the second case, even when only stream ID 872 is statically set, field device 90 can acquire dynamic stream information 870 by receiving manager switching notification 31 transmitted from PLC 100 through network 11.

Because the reception processing of communication frame 20 in field device 90 based on dynamic stream information 870 acquired by the processing in FIG. 33 is similar to the processing in FIG. 32, the description thereof will not be repeated.

(k3. Third Case)

Figure 35:
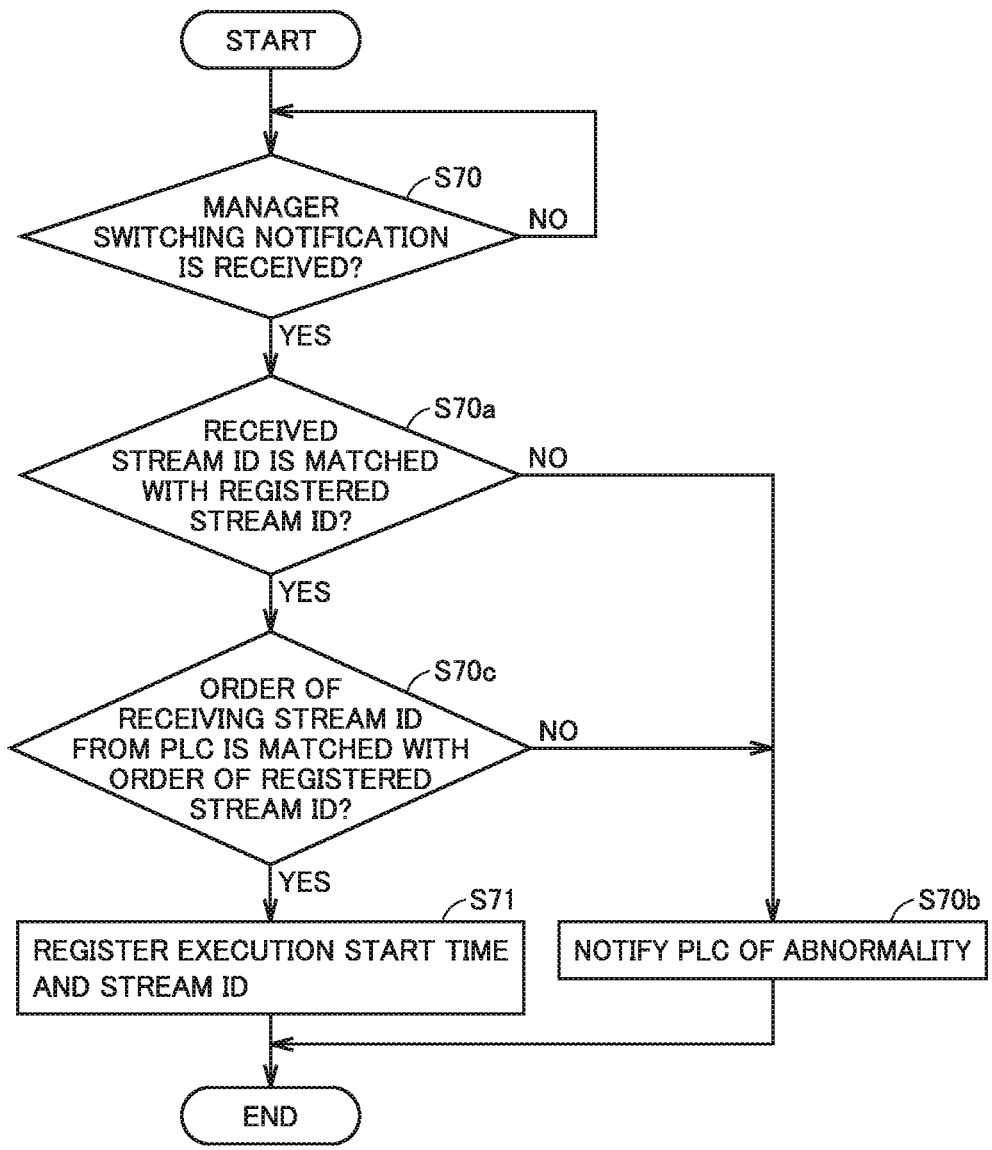
FIG. 35 is a flowchart illustrating processing of a device according to "third case" of the embodiment.
Figure 36:
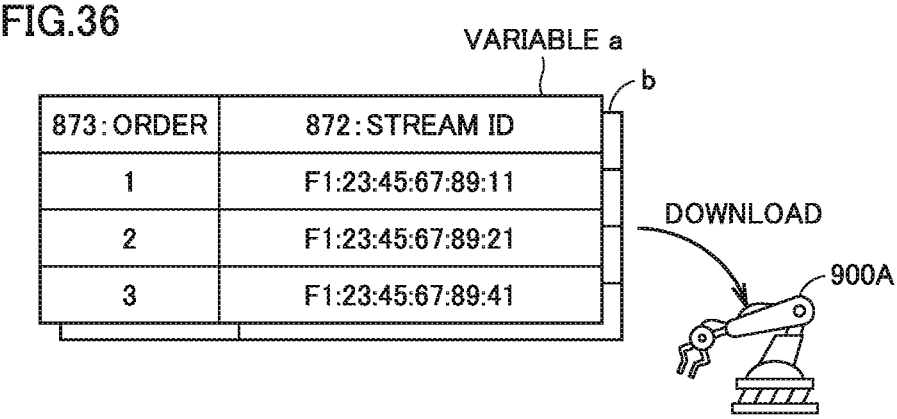
FIG. 36 is a view illustrating an example of the stream information according to "third case" of the embodiment.

FIG. 35 is a flowchart illustrating processing of the device according to "third case" of the embodiment. FIG. 36 is a view illustrating an example of the stream information according to "third case" of the embodiment. In the third case, memory 92 of field device 90 stores at least one stream ID 872 in FIG. 36 and an order 873 corresponding to each of at least one ID 872. Order 873 indicates a relative order in which communication frame 20 having the corresponding stream ID 872 is transferred over network 11.

Referring to FIG. 35, stream information registration unit 910 of the device determines whether to receive manager switching notification 31 through communication basic processing unit 906 (step S70). When stream information registration unit 910 determines that notification 31 is not received (NO in step S70), the determination in step S70 is repeated. When determining that notification 31 is received (YES in step S70), stream information registration unit 910 proceeds to step S70a.

Stream information registration unit 910 determines whether stream ID 292 indicated by received notification 31 is matched with stream ID 872 in FIG. 34 (step S70a). When determining that they stream ID 292 is not matched with stream ID 872 (NO in step S70a), stream information registration unit 910 transmits the abnormality notification to PLC 100 that is the transmission source of notification 31 (step S70b).

On the other hand, when determining that stream ID 292 indicated by the received notification 31 is matched with stream ID 872 in FIG. 34 (YES in step S70a), stream information registration unit 910 proceeds to step S70c.

In step S70c, stream information registration unit 910 determines whether the order of receiving stream ID 292 (notification 31) from PLC 100 is matched with the order (for example, in ascending order) following order 873 in FIG. 36. For example, when the reception order is 1→3→2 of order 873, stream information registration unit 910 determines that the reception order of stream ID 292 is not matched with the order following order 873 in FIG. 36 (NO in step S70c), and proceeds to step S70b.

On the other hand, when determining that the reception order of notification 31 (stream ID 292) from PLC 100 follows order 873 in FIG. 36 (YES in step S70c), stream information registration unit 910 proceeds to step S71. In step S71, execution time 291 of notification 31 is stored in memory 92 in association with matched stream ID 872 in FIG. 36 (step S71). Thus, dynamic stream information 870 (execution start time 291 and stream ID 872) is stored in memory 92.

As in the third case, even in the case where only stream ID 872 is stored, field device 90 can acquire dynamic stream information 870 based on notification 31 received according to order 873.

Because the processing of receiving communication frame 20 in the device based on stream information 87 acquired by the processing in FIG. 35 is similar to the processing in FIG. 32, the description thereof will not be repeated.

L. Variable and Method for Managing Variable

The variable accessed by UPG 69 and a method for managing the variable will be described. FIG. 37 is a view schematically illustrating a concept of variable management of the embodiment. Referring to FIG. 37, the management of the variable accessed by UPG 69 during the execution will be described. In FIG. 37, UPG library 170 of first PLC 100 has UPG (1) and UPG (2), and UPG library 170 of second PLC 100 includes UPG (4). Variable management processing unit 173 of second PLC 100 manages local variable (3) of UPG 69 as input data 134 or output data 135. The data of the variable accessed (read and written) by UPG 69 during the execution is managed as input data 134 or output data 135 by variable management processing unit 173. The variable of the data managed by variable management processing unit 173 includes a local variable of each UPG 69 and a global variable accessible by the plurality of UPGs 69. A certain UPG 69 cannot (is prohibited) access local variables of other UPGs 69. A certain UPG 69 can access a certain global variable when another UPG 69 is not accessing the certain global variable, but cannot access the certain global variable when another UPG 69 is accessing the certain global variable (prohibition (5)). In FIG. 37, UPG (2) cannot access a local variable (1) of UPG (1) (prohibition (4)), and similarly, UPG (1) cannot access a local variable (2) of UPG (2).

When receiving the access request of the local variable from UPG 69, variable management processing unit 173 accesses the data of the local variable according to the received access request (local variable access (1)). Furthermore, when receiving the access request of the global variable from UPG 69, variable management processing unit 173 accesses the data of the global variable according to the received access request when another UPG 69 is not currently executed (global variable access (2)). For example, variable management processing unit 173 can determine whether another UPG 69 is currently executed based on flag 655. The access request from UPG 69 to the local variable and the global variable is given to variable management processing unit 173 without passing through scheduling processing unit 172.

Variable management processing unit 173 performs synchronization (processing (3)) of the global variable between first PLC 100 and the second PLC 100 every time the global variable is rewritten (written) by global variable access (2) during the execution of UPG (1) or UPG (2). Specifically, in the synchronous processing, variable management processing unit 173 of first PLC 100 transmits a rewrite request such that the value of the global variable of the second PLC 100 indicates the rewritten value of the global variable of first PLC 100. In this rewrite request, when the global variable is a variable for which the control instruction is set, communication frame 20 in FIG. 6 having the value (control instruction) of the global variable after being rewritten in payload 26 is transmitted from first PLC 100 onto network 11. Variable management processing unit 173 of second PLC 100 writes the value of payload 26 of received communication frame 20 in the own global variable. Thus, even when UPG (1), UPG (2), and UPG (4) are loaded (disposed) in different PLCs 100, the same value after the rewriting can be referred to (read) each time the value of the global variable is rewritten (written).

M. Computer Program

Although the configuration in which CPU 502 of support device 500 in FIG. 5 executes the program stored in the memory such as HDD 505 to provide setting tool 600 including disposition tool 63 and schedule generation tool 64 has been exemplified, some or all of these provided configuration may be mounted using a dedicated hardware circuit (for example, an application specific integrated circuit (ASIC), a field-programmable gate array (FPGA)). Alternatively, the main part of support device 500 may be implemented using hardware according to a general-purpose architecture. In this case, a plurality of OSs (Operating Systems) having different uses may be executed in parallel using a virtualization technology, and the required application may be executed on each OS.

In addition, support device 500 may include the plurality of processors such as CPU 502. In this case, each unit in FIG. 5 can be executed by the plurality of processors. When CPU 502 includes a plurality of cores, each unit in FIG. 5 can be executed by the plurality of cores in CPU 502.

PLC 100 includes processor 112 corresponding to the CPU, and storage 119 including an HDD, a ROM, and a RAM. Storage 119 stores program and data executed by PLC 100. A part or all of the configuration provided by PLC 100 executing the program of storage 119 may be implemented using a dedicated hardware circuit (for example, ASIC or FPGA). Alternatively, the main part of PLC 100 may be implemented using hardware according to a general-purpose architecture. In this case, the plurality of OSs having different uses may be executed in parallel using a virtualization technology, and the required application may be executed on each OS.

PLC 100 may include the plurality of processors such as the CPU. In this case, each program in FIG. 3 can be executed by the plurality of processors. When the CPU includes the plurality of cores, each program in FIG. 3 can be executed by the plurality of cores in the CPU.

In addition, field device 90 includes processor 91 corresponding to the CPU and memory 92 including the HDD, the ROM, and the RAM. Memory 92 stores the program and data executed by processor 91. A part or all of the configuration provided by processor 91 executing the program of memory 92 may be implemented using a dedicated hardware circuit (for example, ASIC or FPGA). Alternatively, the main part of PLC 100 may be implemented using hardware according to a general-purpose architecture. In this case, the plurality of OSs having different uses may be executed in parallel using a virtualization technology, and the required application may be executed on each OS.

In addition, processor 91 may include the plurality of processors such as the CPU. In this case, each program in FIG. 4 can be executed by the plurality of processors. When the CPU includes a plurality of cores, each program in FIG. 4 can be executed by the plurality of cores in the CPU.

Storage medium 501 of support device 500, memory card 116 of PLC 100, and memory card 96 of field device 90 are media that store information such as a program by electrical, magnetic, optical, mechanical, or chemical action such that a computer or other devices, a machine, or the like can read the information such as the recorded program. CPU 502 of support device 500, processor 112 of PLC 100, and processor 91 of field device 90 may acquire the above-described program from these storage media.

N. Appendix

The embodiment as described above includes the following technical ideas.

[Configuration 1] A control system including:
a plurality of control devices (100) connected to a network (11);
program storage (119) included in each control device storing a control program (69) including a command to calculate and update a control instruction that is a value related to control of a control target (90, 90A, 90B);
operation module (112, 110) included in each control device to operate the control program of the program storage of the control device; and
arbitration module (64, 66) configured to dispose a plurality of control programs including a command to calculate and update an identical control instruction in at least one of the plurality of control devices, and arbitrate an operation time between the plurality of control programs such that updatings of the identical control instruction do not conflict with each other in the plurality of control programs.

[Configuration 2] The control system according to configuration 1, wherein the arbitration module statically determines operation times of the plurality of control programs such that the updatings of the identical control instruction do not conflict with each other in the plurality of control programs.

[Configuration 3] The control system according to configuration 1 or 2, wherein the arbitration module dispersedly disposes the plurality of control programs in the plurality of control devices, and arbitrates the operation time such that each of the plurality of control programs is operated in order according to progress of a process.

[Configuration 4] The control system according to any one of configurations 1 to 3, wherein
the control instruction includes the control instruction provided to the control target, and
the arbitration module further generates identification information (87) for identifying the control instruction addressed to an own control target.

[Configuration 5] The control system according to configuration 4, wherein the identification information for identifying the control instruction addressed to the own control target includes an identifier (872) of a control program in which the control instruction to the control target is updated.

[Configuration 6] The control system according to configuration 5, wherein the identification information for identifying the control instruction addressed to the own control target includes an order (871) in which the plurality of control instructions are provided to the control target when the plurality of control instructions are provided to the control target.

[Configuration 7] The control system according to configuration 6, wherein the order in which the plurality of control instructions are provided to the control target is based on an operation time (651) arbitrated between the plurality of control programs updating the plurality of control instructions.

[Configuration 8] The control system according to configuration 3, wherein
the control device outputs a notification to the control target indicating a switch to one control program when the operation module operates the plurality of control programs while switching the plurality of control programs according to the arbitrated operation time, and
the notification (31) includes identification information (292) for identifying the control instruction updated by the one control program after the switching.

[Configuration 9] The control system according to any one of configurations 4 to 8, wherein the identification information includes a type of the control instruction.

[Configuration 10] The control system according to any one of configurations 1 to 9, wherein a value related to the control includes a value of a variable updated by the control program during operation.

[Configuration 11] A support device (500) connectable to a control system including a plurality of control devices (100) connected to a network (11), each of the control devices including:
program storage (119) storing a control program (69) including a command to calculate and update a control instruction that is a value related to control of a control target; and
operation module (110, 112) operating the control program of the program storage of the control device,
the support device including:
disposition module (63) configured to dispose a plurality of control programs including a command to calculate and update an identical control instruction in at least one of the plurality of control devices; and
arbitration module (64) configured to arbitrate an operation time between the plurality of control programs such that updatings of the identical control instruction do not conflict with each other in the plurality of control programs.

[Configuration 12] A computer-readable storage medium storing a setting program (600) setting a behavior of a control system including a plurality of control devices (100) connected to a network (11), each of the control devices including:

program storage (119) storing a control program (69) including a command to calculate and update a control instruction that is a value related to control of a control target; and operation module (110, 112) operating the control program of the program storage of the control device, the setting program causing a computer (502) to execute:

disposing a plurality of control programs including a command to calculate and update an identical control instruction in at least one of the plurality of control devices (S1, S3, S5); and arbitrating an operation time between the plurality of control programs such that updatings of the identical control instruction do not conflict with each other in the plurality of control programs (S7).

It should be considered that the disclosed embodiment is an example in all respects and not restrictive. The scope of the present invention is defined by not the above description, but the claims, and it is intended that all modifications within the meaning and scope of the claims are included in the present invention.

REFERENCE SIGNS LIST

1: system, 3A, 3B, 3C: equipment group, 11: network, 20: communication frame, 26: payload, 30: multicast address, 31: notification, 62: disposition program, 63: disposition tool, 64: schedule generation tool, 65, 65A: UPG schedule, 66: schedule generation program, 67: stream information generation program, 68: UPG generation program, 69: UPG program, 87: stream information, 90: field device, 90A, 90B: robot controller, 91, 112: processor, 92: memory, 110: arithmetic processing unit, 114: storage unit, 119: storage, 120: peripheral processing program, 121, 831: time synchronization program, 125: refresh program, 126: configuration, 128: manager switching program, 170: UPG library, 171, 172, 902: scheduling processing unit, 173, 903: variable management processing unit, 174, 904: Stream checking processing unit, 175, 905: stream generation processing unit, 176, 906: communication basic processing unit, 179, 909: time synchronization processing unit, 180: manager switching unit, 211: execution instruction, 220: completion notification, 221, 291: execution start time, 500: support device, 870: dynamic stream information, 873: order, 900A, 900B: robot, 901: application processing unit, 910: stream information registration unit, 611: contention detection program

The invention claimed is:

1. A control system comprising:
a plurality of control devices connected to a network, each of the plurality of control devices including:
a storage device that stores a control program; and
at least one processor configured to access the storage device and execute the control program to calculate and update a control instruction that is a value related to control of a control target; and
a support device including a memory storing an arbitration module and a central processing unit (CPU) which accesses the memory and executes the arbitration module to cause the CPU to deploy a plurality of the control programs including a command to calculate and update an identical control instruction in two or more control devices, and arbitrate a different operation time for each update of the identical control instruction among the plurality of control programs, such that the updating of each of the identical control instructions in the plurality of control programs do not conflict with any of the other updates of the identical control instructions in the plurality of control programs.

2. The control system according to claim 1, wherein the different operation times have been statistically determined.

3. The control system according to claim 1, wherein the CPU executes the arbitration module to cause the CPU to arbitrate the different operation times according to an order in which the control instructions are given to the control targets.

4. The control system according to claim 1, wherein:
the control instruction is provided to the control target, and
the CPU executes the arbitration module to cause the CPU to generate identification information for identifying the control instruction addressed to the control target.

5. The control system according to claim 4, wherein the identification information includes an identifier of a control program in which the control instruction is updated.

6. The control system according to claim 5, wherein the identification information includes an order in which the plurality of control instructions are provided to the control target.

7. The control system according to claim 6, wherein the order in which the plurality of control instructions are provided to the control target is based on the different operation times.

8. The control system according to claim 3, wherein:
the control device outputs a notification to the control target indicating a switch to one control program when the plurality of control programs are executed while switching the plurality of control programs according to the arbitrated operation time, and
the notification includes identification information for identifying the control instruction updated by the one control program after the switching.

9. The control system according to claim 4, wherein the identification information includes a type of the control instruction.

10. The control system according to claim 1, wherein the value related to the control includes a value of a variable updated by the control program during operation.

11. A support device connectable to a control system including a plurality of control devices connected to a network, each of the control devices including:
a storage device that stores a control program, and at least one processor configured to access the storage device and execute the control program to calculate and update a control instruction that is a value related to control of a control target,
the support device comprising a memory that stores a disposition module and an arbitration module, and a central processing unit (CPU),
wherein the CPU accesses the memory and executes the disposition module to cause the CPU to deploy a plurality of the control programs including a command to calculate and update an identical control instruction in two or more control devices; and
wherein the CPU accesses the memory and executes the arbitration module to cause the CPU to arbitrate a different operation time for each update of the identical control instruction among the plurality of control programs, such that the updating of each of the identical control instructions in the plurality of control programs do not conflict with any of the other updates of the identical control instructions in the plurality of control programs.

12. A non-transitory computer-readable storage medium storing a setting program setting a behavior of a control system including a plurality of control devices connected to a network, each of the control devices including:
 a storage device that stores a control program, and at least one processor configured to access the storage device and execute the control program to calculate and update a control instruction that is a value related to control of a control target;
 the setting program, when executed by a central processing unit (CPU), causes the CPU to:
  deploy a plurality of the control programs including a command to calculate and update an identical control instruction in two or more control devices; and
  arbitrate a different operation time for each update of the identical control instruction among the plurality of control programs, such that the updating of each of the identical control instructions in the plurality of control programs do not conflict with any of the other updates of the identical control instructions in the plurality of control programs.

13. The control system of claim 1, wherein the memory comprises at least one of a read only memory (ROM), a random access memory (RAM, and a hard disk drive (HDD).

14. The support device of claim 11, wherein the memory comprises at least one of a read only memory (ROM), a random access memory (RAM, and a hard disk drive (HDD).

15. The non-transitory computer-readable storage medium of claim 12, wherein the storage device comprises at least one of a read only memory (ROM), a random access memory (RAM, and a hard disk drive (HDD).

* * * * *